US010562398B2

United States Patent
High et al.

(10) Patent No.: US 10,562,398 B2
(45) Date of Patent: Feb. 18, 2020

(54) SYSTEM AND METHOD FOR AUTONOMOUS BATTERY REPLACEMENT

(71) Applicant: Walmart Apollo, LLC, Bentonville, AR (US)

(72) Inventors: Donald R. High, Noel, MO (US); John J. O'Brien, Farmington, AR (US); Robert L. Cantrell, Herndon, VA (US); Nicholas Ray Antel, Winona, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 182 days.

(21) Appl. No.: 15/813,785

(22) Filed: Nov. 15, 2017

(65) Prior Publication Data
US 2018/0141453 A1 May 24, 2018

Related U.S. Application Data

(60) Provisional application No. 62/425,173, filed on Nov. 22, 2016.

(51) Int. Cl.
*B60L 11/18* (2006.01)
*G05D 1/10* (2006.01)
(Continued)

(52) U.S. Cl.
CPC .......... *B60L 11/1838* (2013.01); *B60L 53/12* (2019.02); *B60L 53/37* (2019.02); *B60L 53/60* (2019.02);
(Continued)

(58) Field of Classification Search
None
See application file for complete search history.

(56) References Cited

U.S. PATENT DOCUMENTS

| 3,876,086 A | 4/1975 | Kappei |
| 5,239,931 A | 8/1993 | Muselli |

(Continued)

FOREIGN PATENT DOCUMENTS

| CN | 102030178 | 4/2011 |
| CN | 201961288 | 9/2011 |

OTHER PUBLICATIONS

PCT; App. No. PCT/US2017/062691; International Search Report and Written Opinion dated Feb. 2, 2018.

*Primary Examiner* — Richard M Camby
(74) *Attorney, Agent, or Firm* — Fitch, Even, Tabin & Flannery LLP

(57) ABSTRACT

An unmanned battery optimization vehicle includes a transceiver, a battery optimization apparatus, and a control circuit. The transceiver is configured to transmit and receive signals. The battery optimization apparatus is configured to interact with a battery disposed at an unmanned autonomous vehicle. The control circuit is coupled to the transceiver and the battery optimization apparatus. The control circuit is configured to cause the unmanned battery optimization vehicle to independently navigate and travel to a present location of the autonomous vehicle based at least in part upon the signals received at the transceiver. When the unmanned battery optimization vehicle reaches the present location of the unmanned autonomous vehicle, the control circuit is further configured to direct the battery optimization apparatus to engage in an interaction with the battery at the unmanned autonomous vehicle. The interaction is effective to optimize battery operation at the unmanned autonomous vehicle.

20 Claims, 26 Drawing Sheets

(51) Int. Cl.
*B64C 39/02* (2006.01)
*G08G 5/00* (2006.01)
*G08G 1/00* (2006.01)
*G08G 5/02* (2006.01)
*G05D 1/06* (2006.01)
*B60L 53/12* (2019.01)
*B60L 58/12* (2019.01)
*B60L 53/80* (2019.01)
*B60L 53/60* (2019.01)
*B60L 53/37* (2019.01)
*G06K 9/00* (2006.01)

(52) U.S. Cl.
CPC ............... *B60L 53/80* (2019.02); *B60L 58/12* (2019.02); *B64C 39/024* (2013.01); *G05D 1/0684* (2013.01); *G05D 1/101* (2013.01); *G08G 1/202* (2013.01); *G08G 5/0013* (2013.01); *G08G 5/0026* (2013.01); *G08G 5/0069* (2013.01); *G08G 5/025* (2013.01); *B60L 2200/10* (2013.01); *B60L 2240/62* (2013.01); *B60L 2240/66* (2013.01); *B64C 2201/042* (2013.01); *B64C 2201/066* (2013.01); *B64C 2201/141* (2013.01); *G06K 9/00637* (2013.01); *G08G 5/0039* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/122* (2013.01); *Y02T 90/124* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01)

(56) References Cited

U.S. PATENT DOCUMENTS

| 8,862,288 | B2 | 10/2014 | Vavrina |
| 9,016,617 | B2* | 4/2015 | Wang .................... B64C 39/024 244/17.17 |
| 9,384,668 | B2 | 7/2016 | Raptopoulos |
| 9,550,577 | B1 | 1/2017 | Beckman |
| 9,573,684 | B2 | 2/2017 | Kimchi |
| 2011/0251935 | A1 | 10/2011 | German |
| 2014/0222271 | A1 | 8/2014 | Merten |
| 2014/0319272 | A1 | 10/2014 | Casado Magaña |
| 2015/0120094 | A1 | 4/2015 | Kimchi |
| 2015/0277440 | A1 | 10/2015 | Kimchi |
| 2016/0039540 | A1 | 2/2016 | Wang |
| 2016/0039542 | A1 | 2/2016 | Wang |
| 2016/0046387 | A1* | 2/2016 | Frolov ............... H04B 7/18506 244/59 |
| 2016/0163204 | A1 | 6/2016 | Raptopoulos |
| 2016/0196755 | A1 | 7/2016 | Navot |
| 2016/0257401 | A1 | 9/2016 | Buchmueller |
| 2016/0300496 | A1 | 10/2016 | Cheatham, III |
| 2017/0110017 | A1 | 4/2017 | Kimchi |
| 2018/0016027 | A1* | 1/2018 | Cheatham, III ....... B64D 45/00 |

* cited by examiner

SYSTEM AND METHOD FOR AUTONOMOUS BATTERY REPLACEMENT

CROSS-REFERENCE TO RELATED APPLICATION

This application claims the benefit of the following U.S. Provisional Application No. 62/425,173 filed Nov. 22, 2016, which is incorporated herein by reference in its entirety.

TECHNICAL FIELD

This invention relates generally to the re-charging of batteries of autonomous vehicles.

BACKGROUND

While autonomous vehicles (such as aerial drones) are in the field supplying customers with goods and services, they often require energy replenishment for their batteries. Replenishment includes physically swapping a charged battery for the depleted battery, or re-charging the depleted battery.

Typically, the replenishment process requires the autonomous vehicle system to either return to its home base, or to travel to some other fixed location in the field. In both situations, there is an inherent inefficiency suffered by the owner of the autonomous vehicle as a result of downtime incurred while the autonomous vehicle travels to the site for replenishment. For example, when the owner is a retailer, the autonomous vehicle cannot deliver packages when its batteries are being replenished resulting in the potential late delivery of packages, increased costs for the retailer, and customer dissatisfaction.

BRIEF DESCRIPTION OF THE DRAWINGS

Disclosed herein are embodiments of systems, apparatuses and methods pertaining to replacing batteries at autonomous vehicles. This description includes drawings, wherein.

Figure 1:
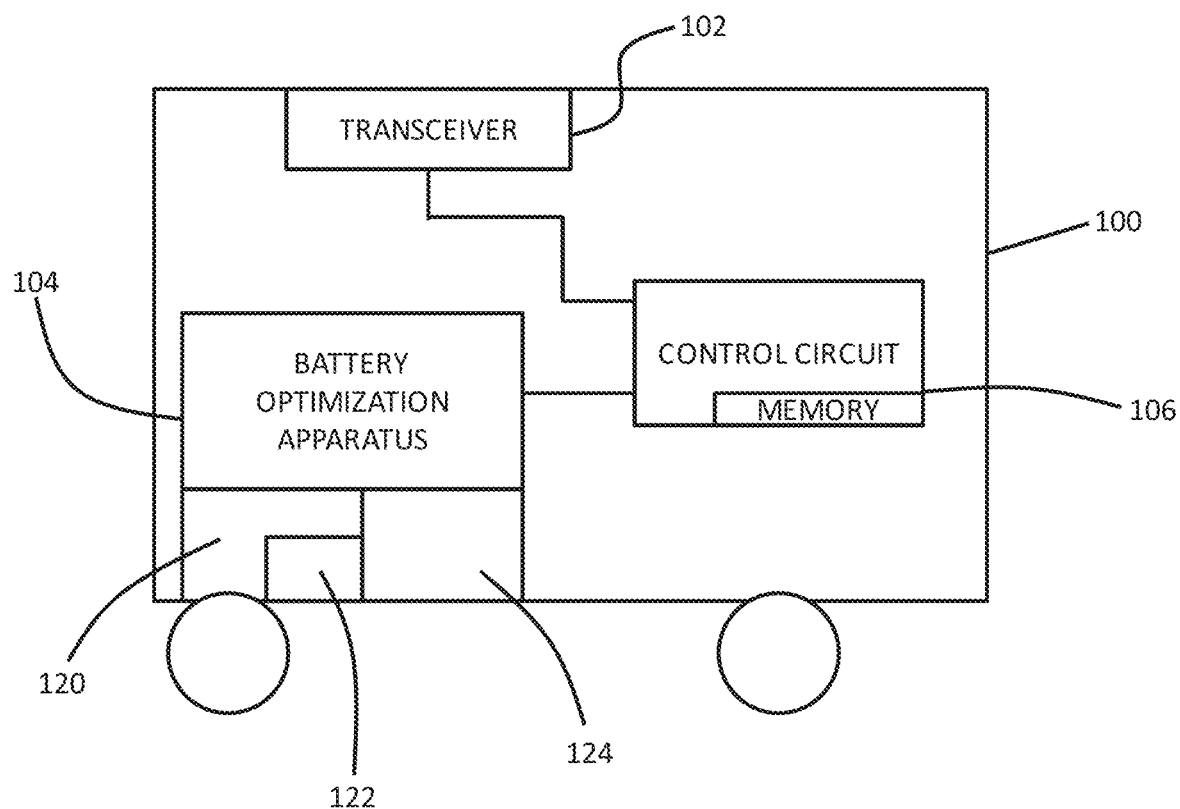
FIG. 1 is a block diagram of an unmanned battery optimization vehicle (battery bot) in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for the replenishment of batteries of autonomous vehicles by seeking these vehicles out in the field. In other words, the autonomous vehicles having batteries in need of re-charge need not return to base. Replenishment may include swapping a charged battery for the depleted battery, or using a wireless or wired connection to re-charge the depleted battery. In so doing, the autonomous vehicle can reduce (or eliminate) the amount of time needed for battery energy replenishment thereby increasing the efficiency of, for example, a product distribution system and increasing the satisfaction of patrons of that system.

In one aspect, instead of having the batteries of an autonomous vehicle re-charged at a home base, the unmanned battery optimization vehicle (also referred to as a "battery bot" herein) provides fully charged batteries to the autonomous system wherever the autonomous vehicle is located. In these regards, the unmanned battery optimization vehicle engages an autonomous vehicle system when the autonomous vehicle is in route to its next designated location. Then, the unmanned battery optimization vehicle allows the autonomous vehicle to retrieve a battery from the unmanned battery optimization vehicle. The autonomous vehicle can then place its depleted battery into the unmanned battery optimization vehicle, and return to its deliveries with an adequately charged battery. If the unmanned battery optimization vehicle still has more charged batteries to deploy, it will engage other autonomous vehicles, providing these systems with charged batteries. If no fresh batteries are available, the unmanned battery optimization vehicle will return to its home base where it will exchange depleted batteries.

In other examples, the battery is not exchanged, but re-charged. For example, a wired or wireless connection from the unmanned battery optimization vehicle to the autonomous vehicle can provide a path to re-charge the battery on the autonomous vehicle.

The unmanned battery optimization vehicle is equipped with transmitters to communicate with other autonomous vehicles, as well as communicate with a central computer system or host. These communications allow the unmanned battery optimization vehicle to send/receive geo-location information from other autonomous vehicle systems. These communications also allow the unmanned battery optimization vehicle to view the power level status of autonomous systems while they are in the field. These communications allow the unmanned battery optimization vehicle to receive commands from a central computer system or host, which will assist the unmanned battery optimization vehicle in efficient deployment of its batteries.

In some embodiments, an unmanned battery optimization vehicle includes a transceiver, a battery optimization apparatus, and a control circuit. The transceiver is configured to transmit and receive signals. The battery optimization apparatus is configured to interact with a battery disposed at an unmanned autonomous vehicle. The control circuit is coupled to the transceiver and the battery optimization apparatus. The control circuit is configured to cause the unmanned battery optimization vehicle to independently navigate and travel to a present location of the autonomous vehicle based at least in part upon the signals received at the transceiver.

When the unmanned battery optimization vehicle reaches the present location of the unmanned autonomous vehicle, the control circuit is further configured to direct the battery optimization apparatus to engage in an interaction with the battery at the unmanned autonomous vehicle. The interaction is effective to optimize battery operation at the unmanned autonomous vehicle. The unmanned autonomous vehicle may be an aerial drone or a ground vehicle.

In some examples, the interaction exchanges or swaps the battery at the unmanned autonomous vehicle with a replacement battery. In other examples, the interaction utilizes a physical connection between the unmanned battery optimization vehicle and the unmanned autonomous vehicle to charge the battery of the unmanned autonomous vehicle. In other examples, the interaction comprises a wireless charging of the battery from the unmanned battery optimization vehicle and the unmanned autonomous vehicle.

In other aspects, the unmanned battery optimization vehicle includes a first storage receptor, a replacement battery disposed in the first storage receptor, and a second storage receptor. The second storage receptor is configured to receive the depleted battery from the unmanned autonomous vehicle.

In examples, the control circuit is configured to receive battery charge level information transmitted from the unmanned autonomous vehicle via the transceiver. In other examples, the control circuit utilizes the battery charge level information to prioritize battery optimization at a plurality of unmanned autonomous vehicles.

In other examples, signals are broadcast from the transceiver that seeks to identify candidate unmanned autonomous vehicles needing battery replacement. In still other examples, broadcast signals are received at the transceiver identifying unmanned autonomous vehicles that desire battery replacement.

In others of these embodiments, an unmanned autonomous vehicle operates in the field away from a base and includes an engine and a propulsion apparatus, a transceiver, a battery, a sensor, and a control circuit. The control circuit is coupled to the sensor, the engine and propulsion apparatus, and the transceiver.

The control circuit is configured to operate the engine and propulsion apparatus to move the vehicle in the field, and sense at least one operational characteristic of the battery using the sensor. The control circuit is further configured to conduct an evaluation, based upon the operational characteristic of the battery, of when to have the battery replaced or recharged by a battery optimization vehicle. The control circuit is configured to transmit a message via the transceiver to request that a battery optimization vehicle replace or re-charge the battery based upon the evaluation. The control circuit is configured to subsequently communicate with the battery optimization vehicle via the transceiver to allow the battery optimization vehicle to recharge or replace the battery.

In still others of these embodiments, a system of unmanned battery optimization vehicles optimizes batteries (or other power storage devices) in autonomous vehicles. The system includes multiple unmanned battery optimization vehicles that operate independently (e.g., without being under the control of a home office or centralized control center). The battery optimization vehicles optimize batteries in autonomous vehicles.

The unmanned autonomous vehicles operate in the field (e.g., any geographic area) independently and away from a base. The unmanned autonomous vehicles include a battery, and the battery has a condition requiring optimization.

The unmanned battery optimization vehicle operates in the field and independently discovers the condition of the battery of the unmanned autonomous vehicle. The unmanned battery optimization vehicle also independently navigates to the unmanned autonomous vehicle. When the unmanned battery optimization vehicle reaches the location of the unmanned autonomous vehicle, the unmanned battery authorization vehicle engages in an interaction with the battery. The interaction is effective to optimize operation of the battery at the unmanned autonomous vehicle.

Referring now to FIG. 1, an unmanned battery optimization vehicle 100 includes a transceiver 102, a battery optimization apparatus 104, and a control circuit 106. The transceiver 102 is configured to transmit and receive signals. The signals may be exchanged with an autonomous vehicle or a central control center. The exchange of these signals allows the vehicle 100 to find and navigate to an autonomous vehicle in need of battery replenishment. For example, the signals may be sent from the host informing the vehicle where an autonomous vehicle in need of replenishment is located. When the vehicle 100 nears the autonomous vehicle, the signals may be used to perform authentication between the vehicle 100 and the autonomous vehicle.

In aspects, the transceiver 102 may broadcast signals to any entity that is listening (e.g., using WiFi). In other aspects, the transceiver 102 may transmit signals directed to a central station or host. The central host may schedule replenishment operations and direct the vehicle 100. The transceiver 102 may transmit signals directly to an autonomous vehicle and coordinate a replenishment operation with the autonomous vehicle without the intervention of a central host.

The battery optimization apparatus 104 is configured to interact with a depleted battery disposed at an unmanned autonomous vehicle. In one example, a mechanical apparatus is provided that retrieves a battery in need of replenishment, stores it in the vehicle 100, retrieves from the vehicle 100 a replacement battery, and places the replacement battery in the autonomous vehicle. In still another example, the apparatus 104 is a physical cable that is connected from a battery in the vehicle 100 to the battery in the autonomous vehicle in need of energy replenishment. In another example, the apparatus 104 is a wireless interface allowing the wireless transfer of energy from the vehicle 100 to the battery in the autonomous vehicle in need of energy replenishment.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 106 may be configured (for example, by using corresponding programming stored in a memory as will be well understood by those skilled in the art) to carry out one or more of the steps, actions, and/or functions described herein.

The control circuit 106 is coupled to the transceiver and the battery optimization apparatus. The control circuit 106 is configured to cause the unmanned battery optimization vehicle 100 to independently navigate and travel to a present location of the autonomous vehicle based at least in part upon the signals received at the transceiver 102. When the unmanned battery optimization vehicle 100 reaches the present location of the unmanned autonomous vehicle, the control circuit 106 is further configured to direct the battery optimization apparatus 104 to engage in an interaction with the battery at the unmanned autonomous vehicle. The interaction is effective to optimize battery operation at the unmanned autonomous vehicle 100. The unmanned autonomous vehicle may be an aerial drone or a ground vehicle.

In other aspects, the unmanned battery optimization vehicle 100 includes a first storage receptor 120 and a replacement battery 122 disposed in the first storage receptor 120. Vehicle 100 also includes a second storage receptor 124 that is configured to receive the battery from the unmanned autonomous vehicle.

In examples, the control circuit 106 is configured to receive battery charge level information transmitted from the unmanned autonomous vehicle via the transceiver 102. In other examples, the control circuit 106 utilizes the battery charge level information to prioritize battery optimization at a plurality of unmanned autonomous vehicles.

In yet other examples, signals are broadcast from the transceiver 102 that seek to identify candidate unmanned autonomous vehicles needing battery replacement. In still other examples, broadcast signals (from autonomous vehicles) are received at the transceiver 102 identifying unmanned autonomous vehicles that desire battery replacement.

In other examples, an audit trail of repairs made to autonomous vehicles is maintained. For example, the unmanned battery optimization vehicle 100 may maintain information including identities of the vehicles it repairs, the location of the repairs, the nature of the repairs, the time of day of the repairs, the time length needed to make the repairs, and the results (e.g., success of failure) of the repairs. Blockchain or other similar approaches may be used to log repair events. The vehicle 100 may transmit its log to a central processing center. Other optimization vehicles may also send their logs to the central processing center, which may assemble, present, or further process the information. Users can then view the information and may take actions as needed (e.g., change battery types in vehicles when it is determined that certain types of batteries are constantly failing and are potentially defective).

Figure 2:
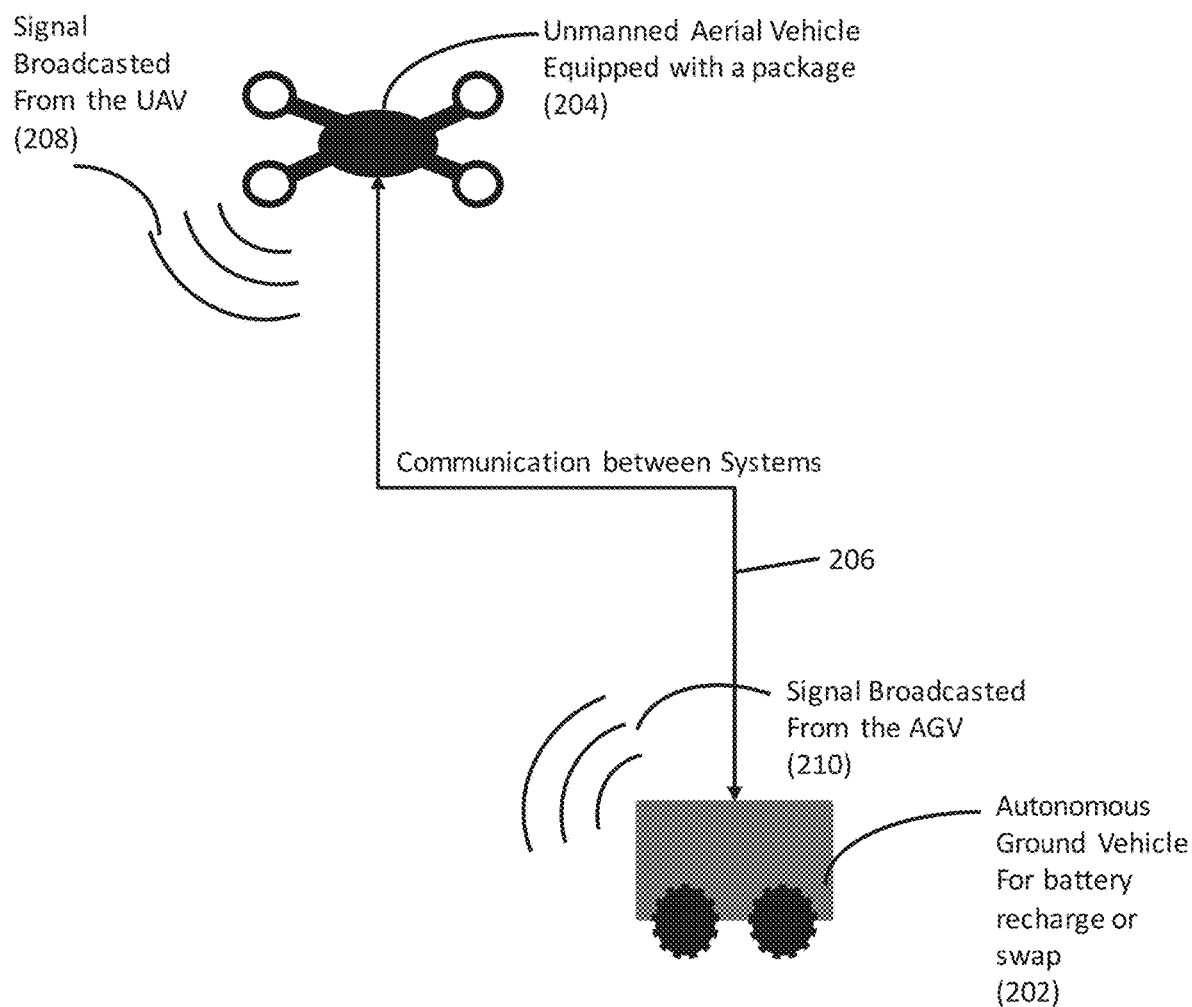
FIG. 2 is a block diagram showing one example of the communications between an unmanned battery optimization vehicle and a drone in accordance with some embodiments.

Referring now to FIG. 2, one example of the communications between an unmanned battery optimization vehicle 202 and a drone (or other autonomous vehicle) 204 is described. A communication link 206 is established between the unmanned battery optimization vehicle 202 and the drone. This allows authentication to occur between the two vehicles. Authentication ensures that each vehicle knows that a genuine energy replenishment operation is occurring, and that one of the vehicles is not seeking to harm the other vehicle. Signals 208 (transmitted from the drone 204) and 210 (transmitted from the unmanned battery optimization vehicle 202) may be used in the authentication process.

Figure 3:
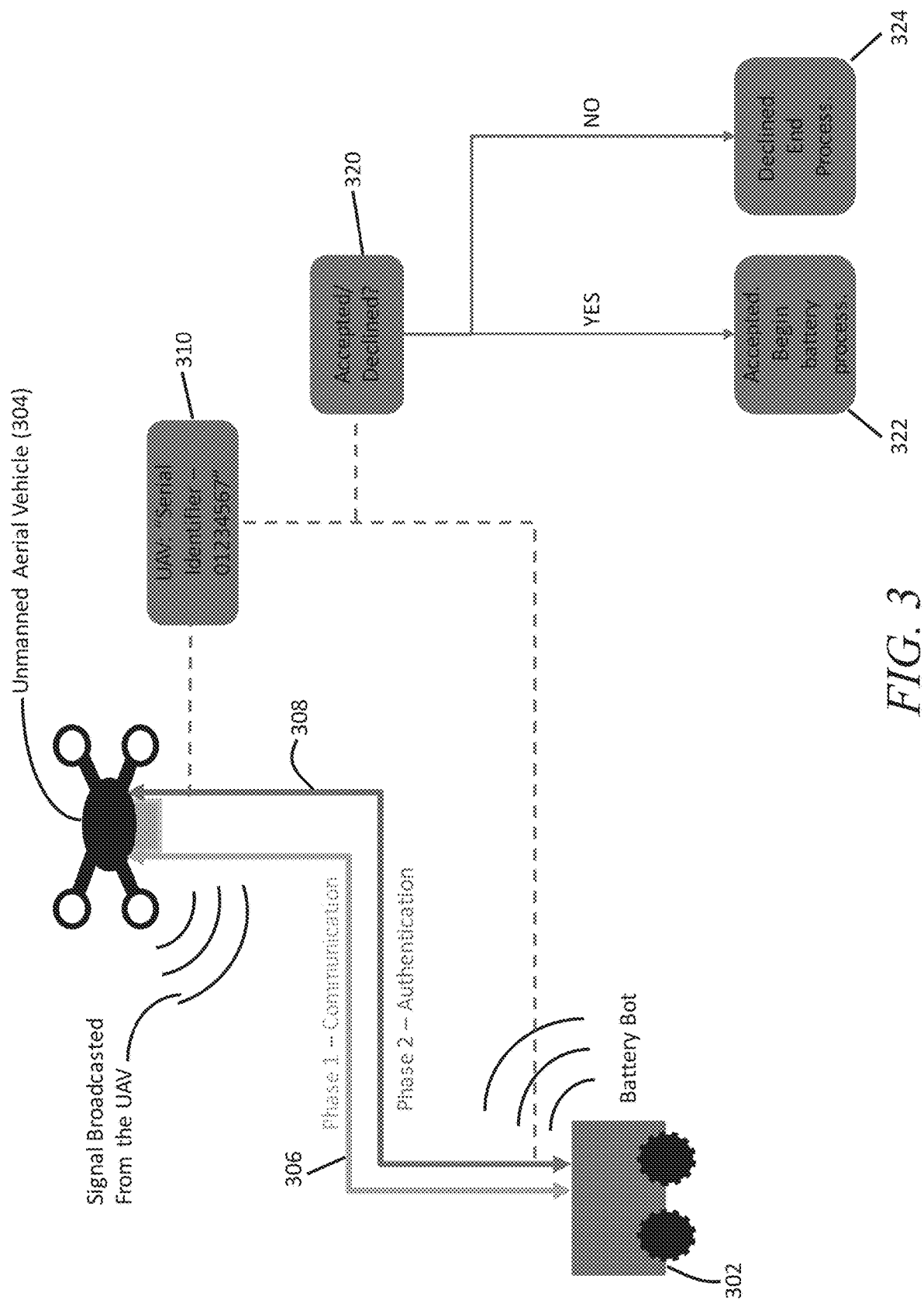
FIG. 3 is a block diagram showing one example of the communications between an unmanned battery optimization vehicle and a drone in accordance with some embodiments.

Referring now to FIG. 3, one example of an authentication process between an intelligent and an unmanned battery optimization vehicle 302 and a drone (or other autonomous vehicle) 304 is described. In a first phase, communications 306 are exchanged between the unmanned battery optimization vehicle 302 and the autonomous aerial drone 304. The communications 306 may be effective to establish a communication link between the unmanned battery optimization vehicle 302 and the autonomous aerial drone 304.

Authentication communications 308 are then exchanged between the unmanned battery optimization vehicle 302 and the autonomous aerial drone 304. For example, an unmanned aerial vehicle identifier 310 may be sent from the drone 304 to the unmanned battery optimization vehicle 302. At the unmanned battery optimization vehicle 302, authentication of the identifiers 310 and 312 are performed at step 320. For example, the received identifier may be compared to a list of acceptable and verified identifiers. If there is a match, the identifier is authenticated, and if there is no match, the identifier is not authenticated.

If the identifier is accepted, then at step 322, the energy replacement process proceeds (e.g., the battery is swapped or re-charged). If the identifier is not accepted, at step 324 the process is ended. In other examples, the unmanned battery optimization vehicle 302 may send an identifier to the drone 304, and the drone 304 may perform an authentication process similar to the process performed at the unmanned battery optimization vehicle 302. Authentication allows the delivery process to proceed.

Figure 4:
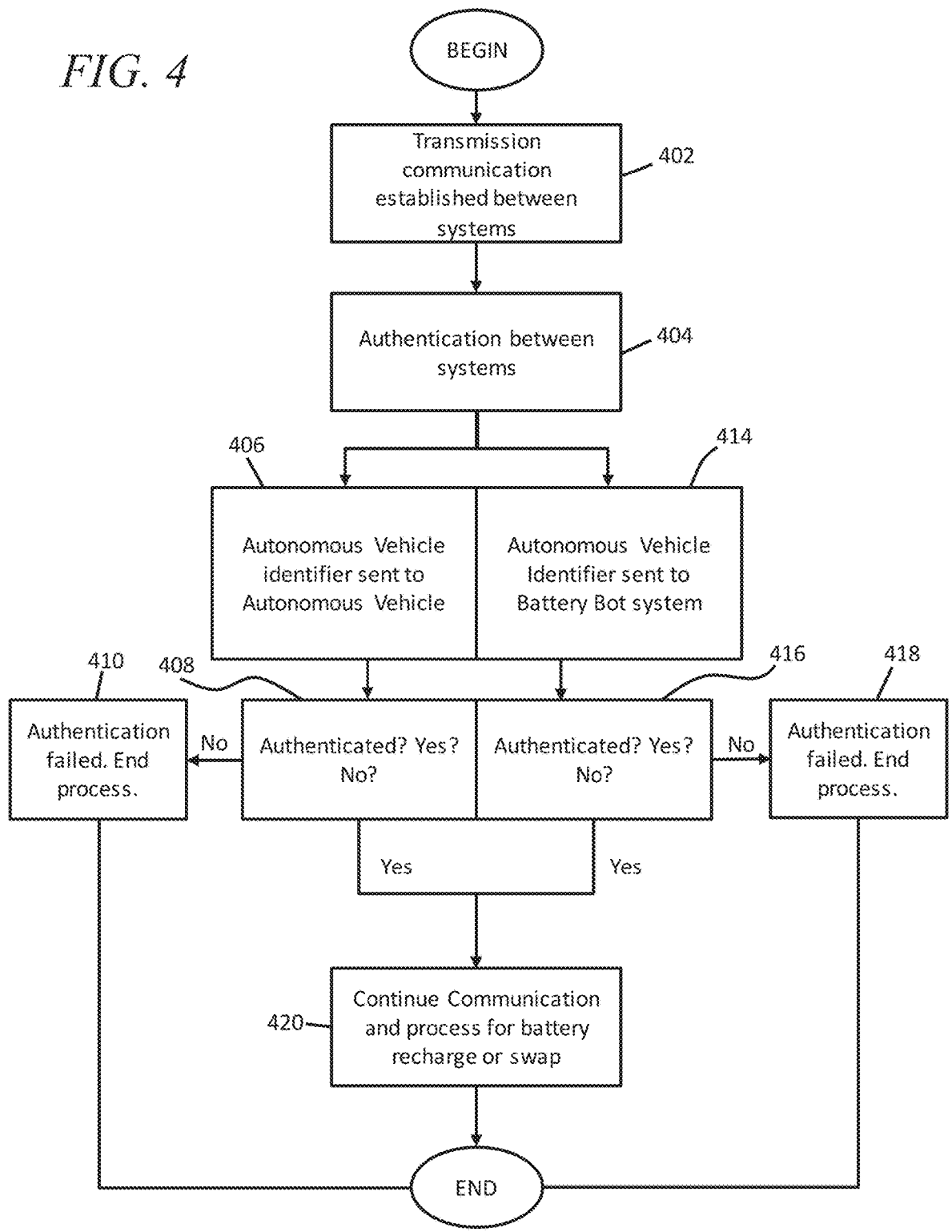
FIG. 4 is a flowchart showing one example of the communications between an unmanned battery optimization vehicle and an autonomous vehicle in accordance with some embodiments.

Referring now to FIG. 4, one example of an authentication process between a drone (or other autonomous vehicle) and an unmanned battery optimization vehicle is described. At step 402, a communication link is established between the drone and the unmanned battery optimization vehicle. At step 404, authentication begins between the drone and the unmanned battery optimization vehicle by executing two paths. A first path includes steps 406, 408, 410 and 420. A second path includes steps 414, 416, 418, and 420.

In the first path, at step 406 an identifier from the unmanned battery optimization vehicle is sent to the drone. The identifier may include (in examples) a serial number, a blockchain key, or other identification or verification information. At step 408, authentication of the identifier is performed. For example, the received identifier may be compared to a list of acceptable and verified identifiers. If the answer is negative, at step 410 authentication fails and the process ends. If the answer is affirmative, at step 412, the communication process continues (e.g., the communication path may be used to guide the drone to and from the unmanned battery optimization vehicle) and the energy replenishment process proceeds.

In the second path and at step 414, an identifier is sent from the drone to the unmanned battery optimization vehicle. The identifier may include (in examples) a serial number, a blockchain key, or other information. At step 416, authentication of the identifier is performed. For example, the received identifier may be compared to a list of acceptable and verified identifiers. If the answer is negative, at step 418, authentication fails and the process ends. If the answer is affirmative, at step 412, the communication process continues (e.g., the communication path may be used to guide the drone to and from the unmanned battery optimization vehicle) and the energy replenishment process proceeds.

Referring now to FIGS. 5A-5F, one example of a navigation sequence between an unmanned aerial vehicle (UAV) (e.g., a drone) 504 and an unmanned battery optimization vehicle 502 is described. In aspects, these approaches may also be applied to other autonomous vehicles. A communication link 506 acts as a conduit or path to exchange messages (or information) between the two devices. In one example, the link 506 is wireless. The drawings show the sequence of the drone 504 replenishing the energy (e.g., swapping the battery or re-charging) at the unmanned battery optimization vehicle 502. These approaches are also applicable to other autonomous vehicles such as autonomous ground vehicles.

The example sequence shown in FIGS. 5A-5F includes six phases. In a first phase, the drone 504 (or other autonomous vehicle) sends information to the unmanned battery optimization vehicle 502. This information may include wind speed, altitude, and airframe speed, to mention a few examples. Video feeds from the autonomous vehicle may also be distributed to the unmanned battery optimization vehicle 502. The drone 504 also communicates information concerning its location.

The unmanned battery optimization vehicle 502 communicates information to the drone concerning wind speed, location information, and distance between the systems. Video feeds from the unmanned battery optimization vehicle 502 may also be distributed to the drone 504.

In a second phase, the drone 504 (or other autonomous vehicle) communicates information concerning its location and position information in real-time with continuous updates to the unmanned battery optimization vehicle 502. The drone 504 may send information such as wind speed, altitude, airframe speed, and the distance and position between the two systems. Video feeds from the drone 504 may also be distributed to the unmanned battery optimization vehicle 502.

The unmanned battery optimization vehicle 502 communicates information on its location in real-time with continuous updates to the drone 504. Information may include wind speed, location information, and distance between the systems. Video feeds from the unmanned battery optimization vehicle 502 may also be distributed to the drone 504.

In a third phase, the unmanned battery optimization vehicle 502 assists the drone 504 (or other autonomous vehicle) with navigation to the unmanned battery optimization vehicle 502. The drone 504 may send information such as changes for wind speed, altitude, airframe speed, and distance and position between the two systems. This process is ongoing until the energy replenishment process is completed.

In a fourth phase, the energy replenishment process between the drone 504 and the unmanned battery optimization vehicle 502 occurs. In a fifth phase, the drone 504 leaves the unmanned battery optimization vehicle 502. In a sixth phase, other devices may obtain information about the replenishment process.

Figure 5A:
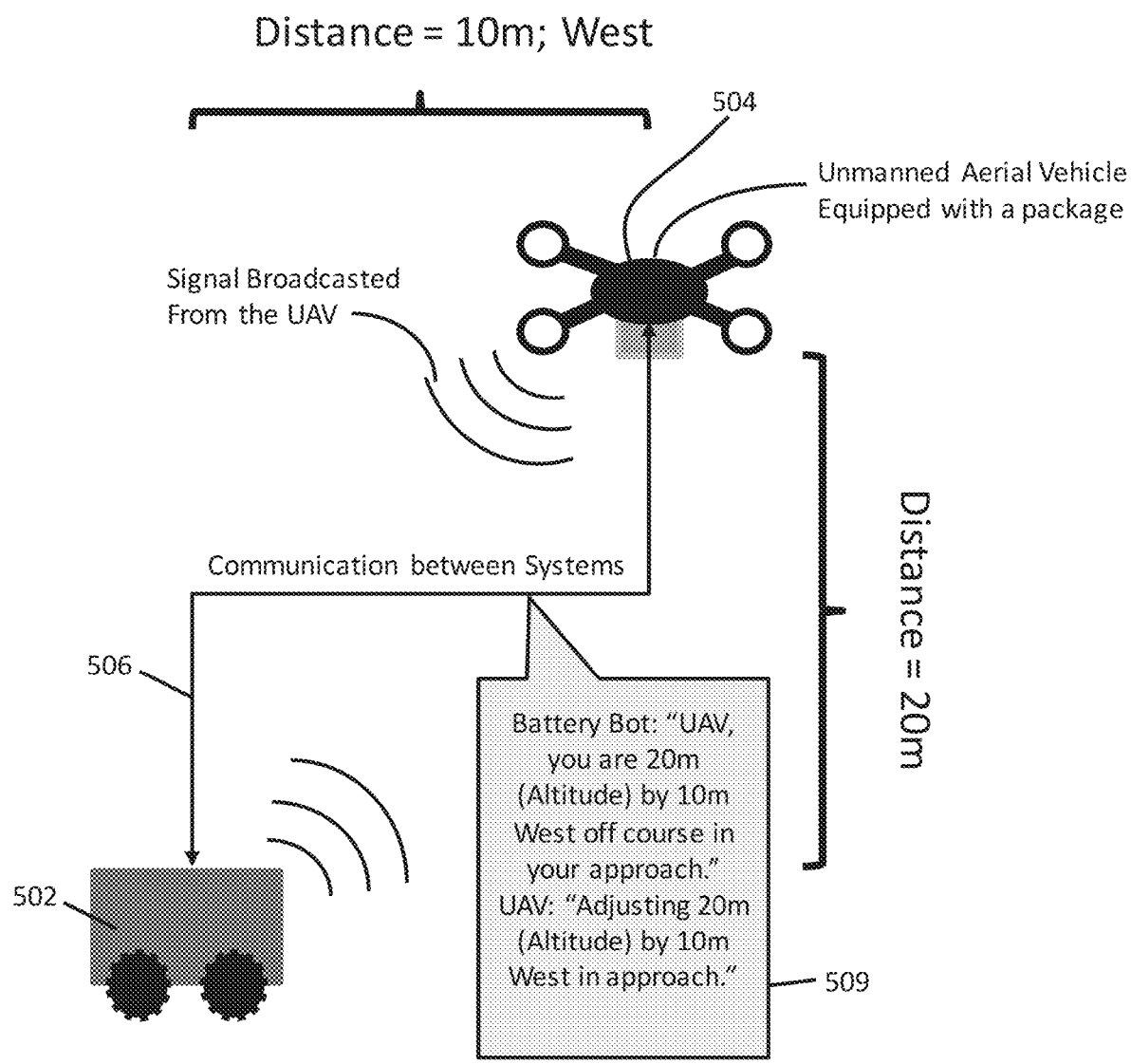
FIGS. 5A-5F are diagrams showing communications between a drone and a battery bot in accordance with some embodiments.

Turning now to FIG. 5A (phase 1), the drone 504 is 10 m west of the unmanned battery optimization vehicle 502. A message 509 from the unmanned battery optimization vehicle 502 to the UAV 504 indicates that the UAV 504 is 20 m in height and 10 m too far west off course. A message 509 sent from the drone 504 to the unmanned battery optimization vehicle 502 indicates that the drone 504 is adjusting its altitude and course.

Figure 5B:
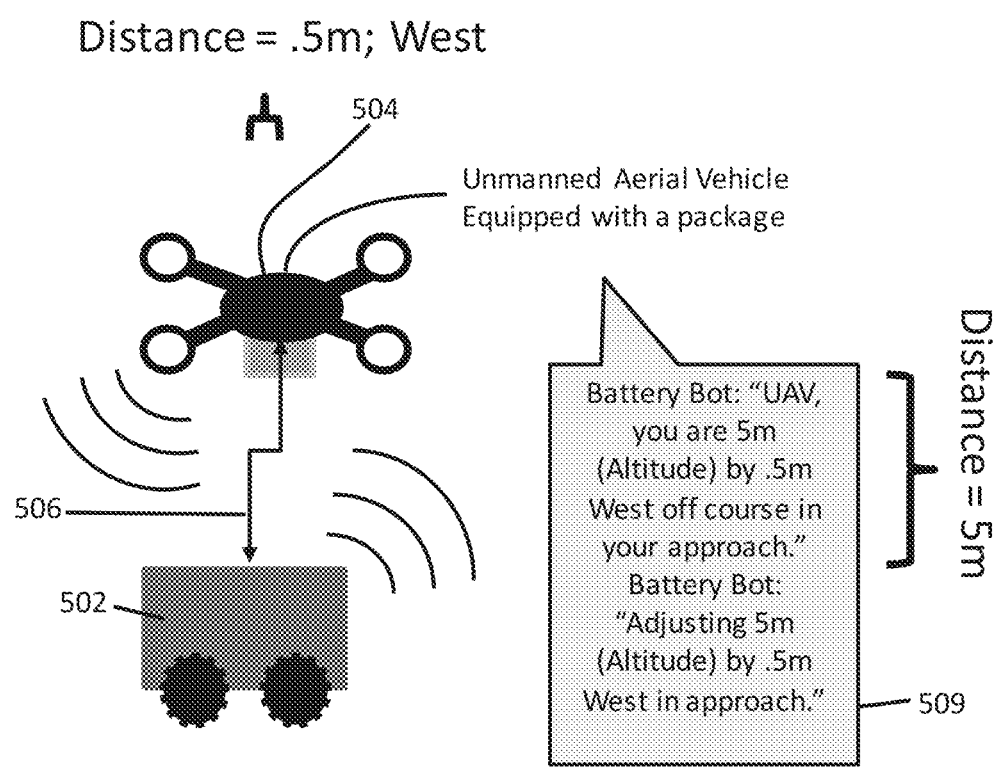

In FIG. 5B (phase 2), the drone 504 is 0.5 m west of the unmanned battery optimization vehicle 502. A message 509 from the unmanned battery optimization vehicle 502 indicates to the drone 504 that the drone 504 is at 5 m in height and 0.5 m too far west off course. A message 509 sent from the drone 504 to the unmanned battery optimization vehicle 502 indicates that the drone 504 is adjusting its altitude and course.

Figure 5C:
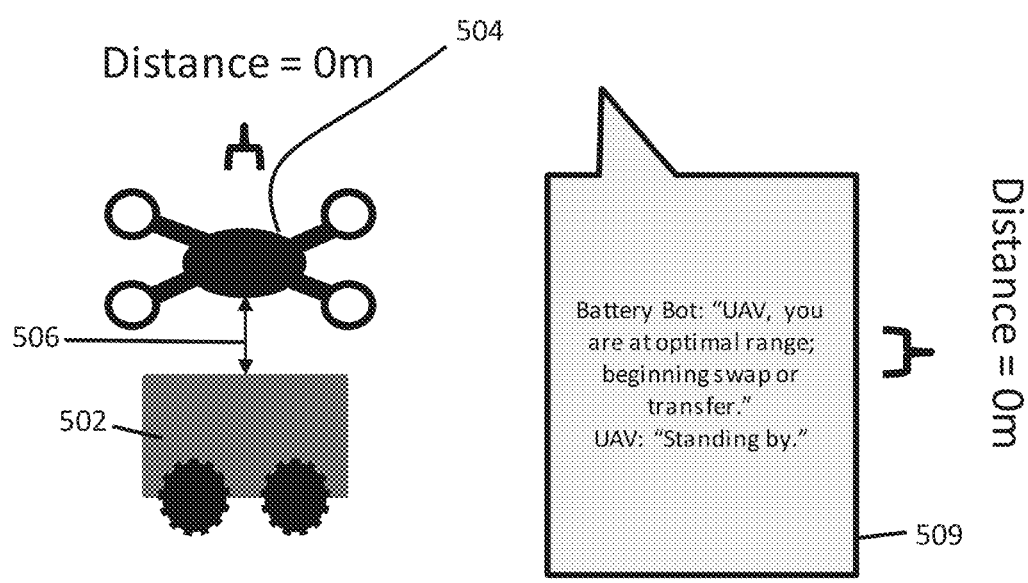

In FIG. 5C (phase 3), the drone 504 is 0 m from the unmanned battery optimization vehicle 502. That is, the drone 504 is now at the unmanned battery optimization vehicle 502. A message 509 sent from the vehicle 502 indicates to the UAV 504 that it is at an optimal range for energy replenishment. A message 509 from drone 504 to the unmanned battery optimization vehicle 502 indicates that the drone 504 is standing by for further action.

Figure 5D:
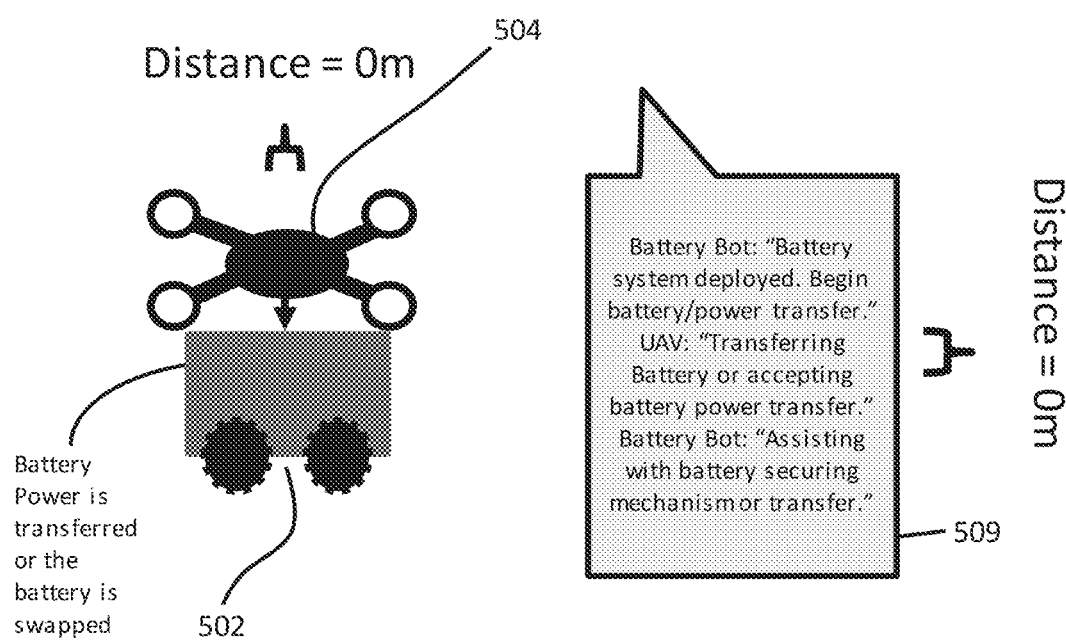

At FIG. 5D (phase 4), the drone 504 is 0 m from the unmanned battery optimization vehicle 502. A message 509 is sent from the unmanned battery optimization vehicle 502 to the drone 504 that battery system is deployed and the transfer process can begin. A further message 509 sent from the drone 504 to the unmanned battery optimization vehicle 502 indicates that the drone 504 is performing the process. Another message is sent from the unmanned battery optimization vehicle 502 to the drone 504 indicating that the unmanned battery optimization vehicle 502 is assisting with the process.

Figure 5E:
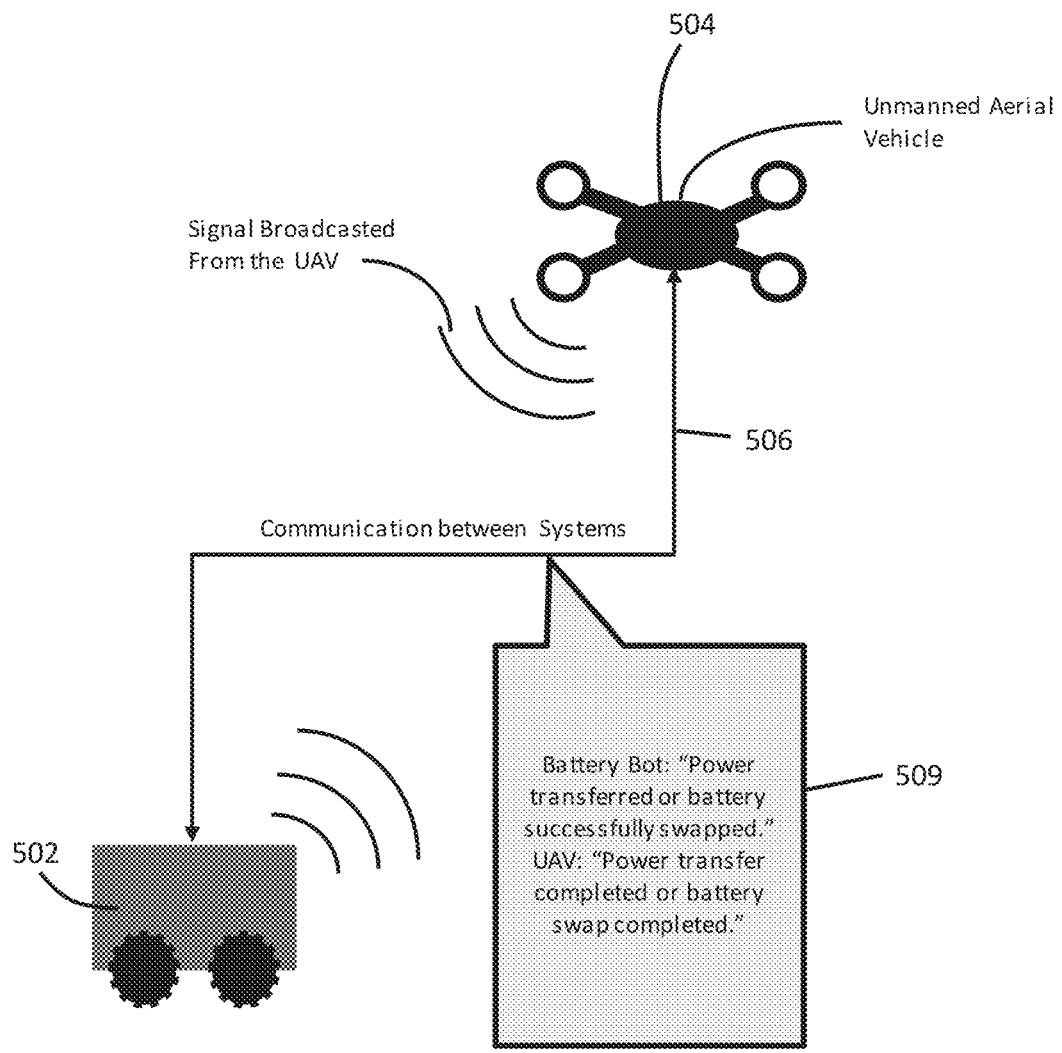

At FIG. 5E (phase 5), the drone is flying away from the unmanned battery optimization vehicle 502. A message 509 is sent from the unmanned battery optimization vehicle 502 to the drone 504 that indicates that the process is complete. Another message 509 is sent from the drone 504 to the unmanned battery optimization vehicle 502 indicating that the process is complete.

Figure 5F:
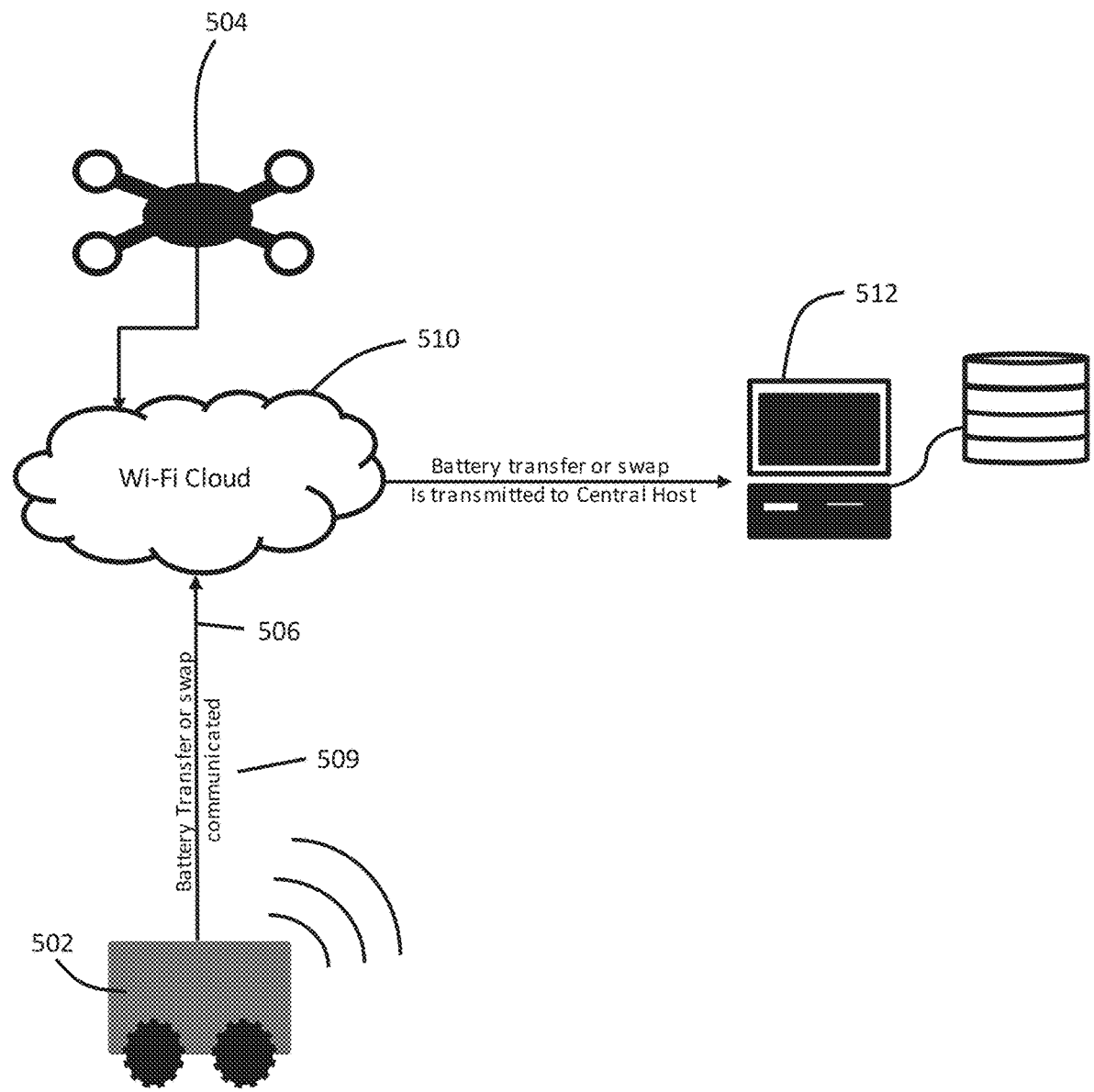

At FIG. 5F (phase 6), the unmanned battery optimization vehicle 502 communicates with a WiFi cloud (or other network) 510. The cloud 510 also communicates with the UAV 504. The unmanned battery optimization vehicle 502 sends a message 509 to the cloud 509 reporting that the energy replacement process has been completed. The message 509 may be stored at the cloud 510. A central control center or host 512 communicates with the cloud 510 and can obtain or retrieve the message 509. Thus, a central control center 512 has access to the information concerning the replenishment operation.

Figure 6:
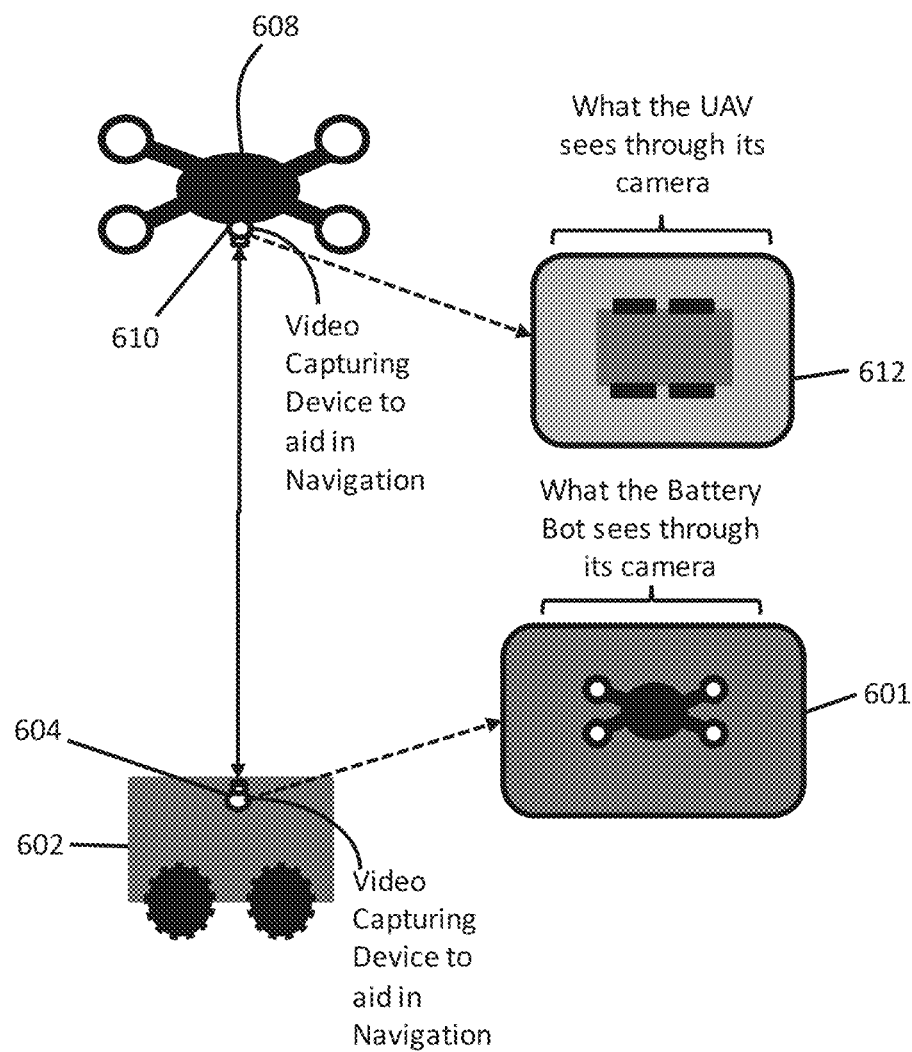
FIG. 6 is a block diagram showing the use of video capabilities in the guidance of an autonomous vehicle in accordance with some embodiments.
Figure 7:
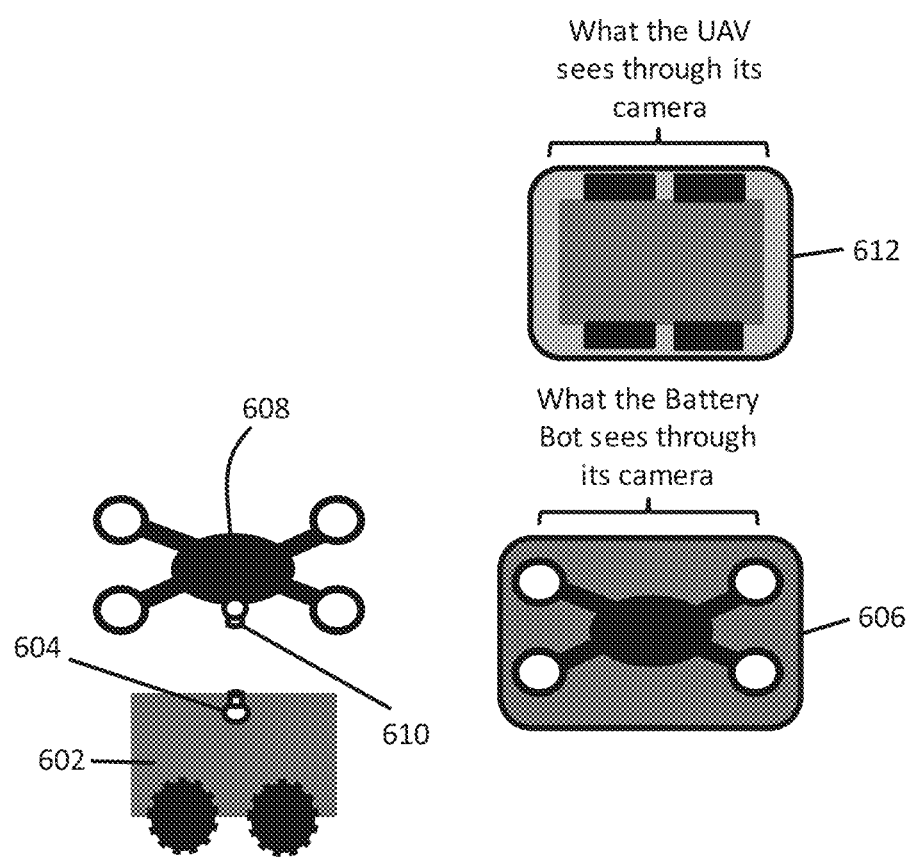
FIG. 7 is a block diagram showing another example of the use of video capabilities in the guidance of an autonomous vehicle in accordance with some embodiments.

Referring now to FIG. 6 and FIG. 7, one example of a drone (or other autonomous vehicle) and an unmanned battery optimization vehicle with live video capabilities is described. The unmanned battery optimization vehicle 602 includes a camera 604 that obtains an image 606. The drone 608 includes a camera 610 that obtains an image 612. The images 606 and 612 may be part of live streaming images, which aid in the navigation of the drone 608 to and from the unmanned battery optimization vehicle 602. For example, the images may be used by the drone to make navigational adjustments and course corrections. The images in FIG. 6 represent a deployment situation where the drone 608 is relatively far from the unmanned battery optimization vehicle 602. The images of FIG. 7 represent the deployment situation where the drone 608 is relatively close to the unmanned battery optimization vehicle 602.

Figure 8:
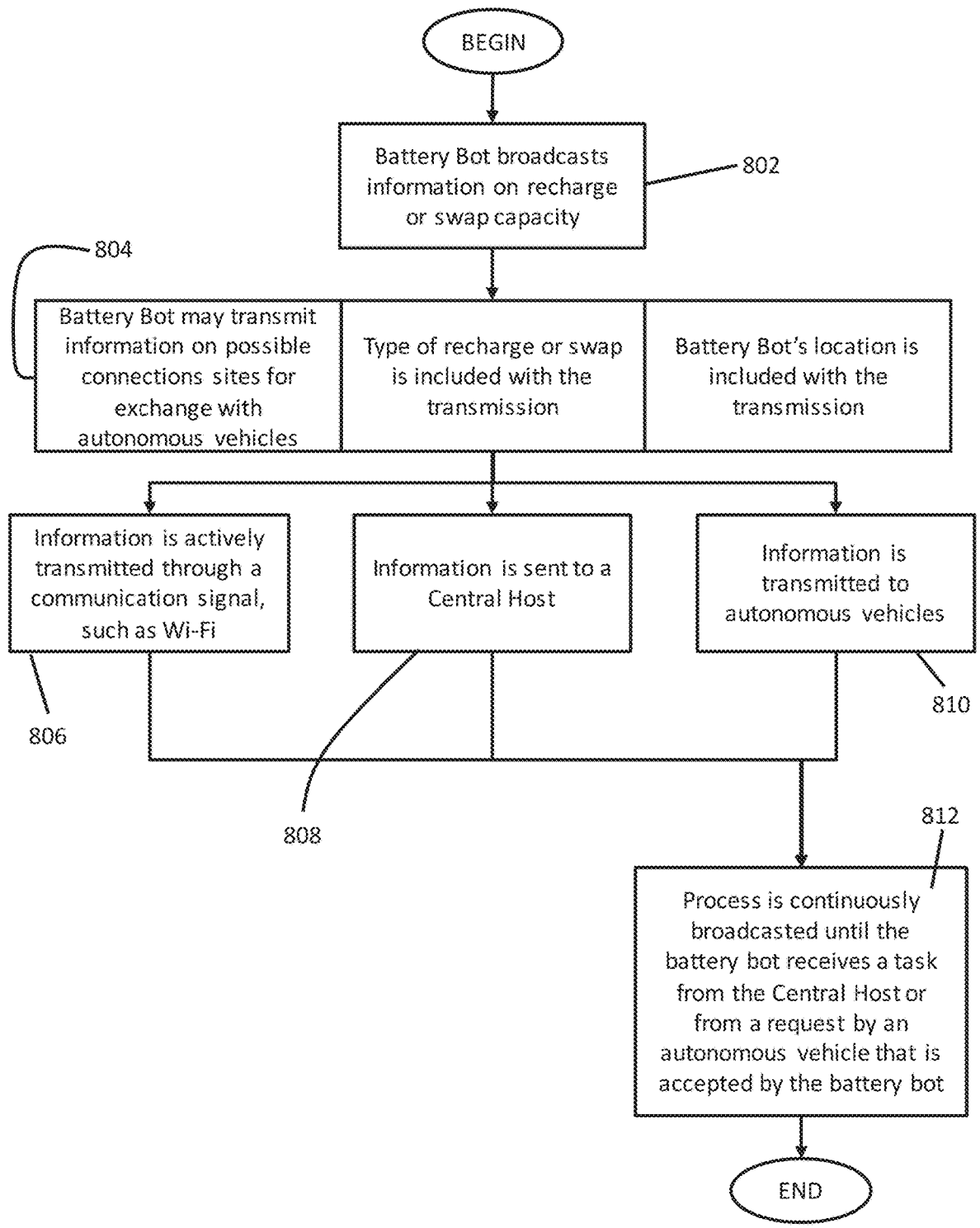
FIG. 8 is a flowchart showing aspects of a re-charging or swapping process in accordance with some embodiments.

Referring now to FIG. 8, one example of a battery energy replenishment process is described. At step 802, the unmanned battery optimization vehicle (battery bot) broadcasts information about its re-charge or swap capacity. The information can include the number of batteries it has and/or the energy levels of these batteries. This broadcast information is received by any vehicles that potentially need to replenish their batteries.

At step 804, the unmanned battery optimization vehicle transmits information on possible connection sites (physical locations) with autonomous vehicles. For instance, certain vehicles may not be able to travel or reside at certain locations if the location is too hilly, too swampy, or not accessible by a road to mention a few examples. The type of replenishment (re-charge or swap) that will occur is also included in the transmitted information as is the location of the unmanned battery optimization vehicle.

Steps 806, 808, and 810 may be performed in parallel. At step 806, information is actively broadcast to any entity that is listening via a communication signal such as WiFi. At step 808, information is sent to a central host. At step 810, information is transmitted to autonomous vehicles.

At step 812, the process continuously broadcasts signals until the unmanned battery optimization vehicle receives a task from the central host or from a request from an autonomous vehicle that is accepted by the unmanned battery optimization vehicle.

Figure 9:
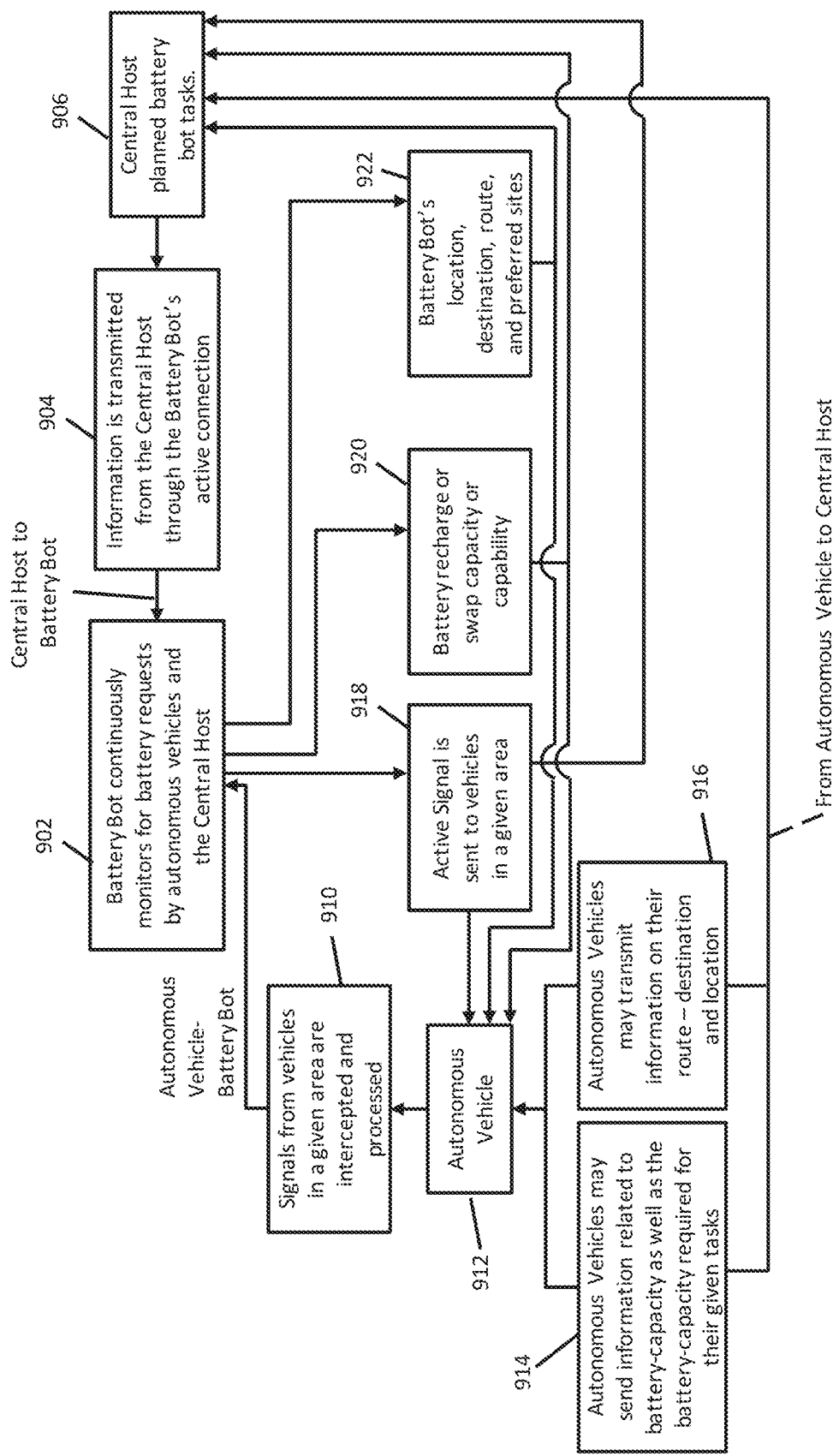
FIG. 9 is a flowchart showing aspects of a re-charging or swapping process in accordance with some embodiments.

Referring now to FIG. 9, one example of an active monitoring process by the unmanned battery optimization vehicle is described. An unmanned battery optimization vehicle (battery bot) 902 continuously monitors for battery requests 904 that originate from a central host 906, or requests 910 that originate from an autonomous vehicle 912. The autonomous vehicle 912 may transmit battery capacity information 914 (information related to the battery at the autonomous vehicle as well as the amount of battery capacity required to complete a task) to the central host 906. The autonomous vehicle 912 may send location information 916 (information concerning the route and destination for the autonomous vehicle) to the central host 906.

In aspects, the unmanned battery optimization vehicle (battery bot) 902 transmits three types of information to the autonomous vehicle 912 and the central host 906. A first piece of information 918 is an active signal that indicates the unmanned battery optimization vehicle (battery bot) 902 is in the area. The second piece of information 920 indicates the re-charge capacity or swap capacity of the unmanned battery optimization vehicle (battery bot) 902. The third piece of information 922 indicates the location, destination, route and/or preferred sites of the unmanned battery optimization vehicle (battery bot) 902.

Figure 10:
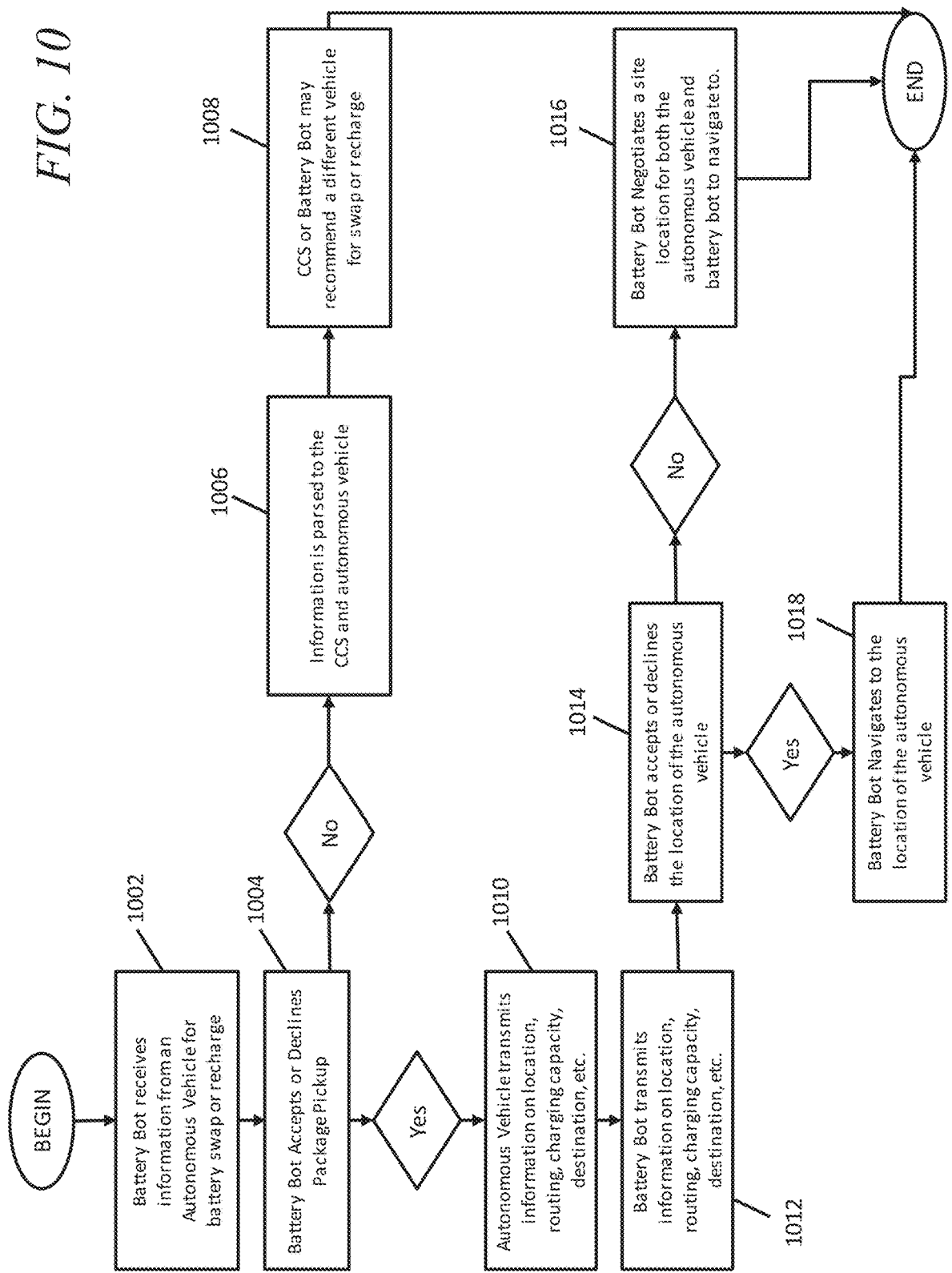
FIG. 10 is a flowchart showing aspects of a re-charging or swapping process in accordance with some embodiments.

Referring now to FIG. 10, one example of the coordination between an unmanned battery optimization vehicle (battery bot) and an autonomous vehicle is described. At step 1002, the battery bot receives information from an autonomous vehicle requesting a swap or re-charge. At step 1004, the battery bot determines whether to accept or decline the re-charge request. If declined, at step 1106, information concerning the decline may be sent to a central service center and the autonomous vehicle. For instance, the reason for the decline may be given. At step 1108, the central service center or the battery bot may recommend a different battery bot to complete the replenishment and send this information to the autonomous vehicle. In aspects, the central service center may keep track of all battery bots including their location, status (e.g., operable or inoperable), number of replacement batteries at each battery bot, and/or the charge levels of these batteries, to mention a few examples.

If the answer is affirmative, at step 1010 the autonomous vehicle transmits information concerning location, routing charging capacity and/or destination. At step 1012, the battery bot transmits information concerning location, routing charging capacity and/or destination to the autonomous vehicle. At step 1014, the battery bot accepts or declines the location of the autonomous vehicle. If declined, at step 1016 the battery bot negotiates a different location for the battery bot and autonomous vehicle to meet and transfer then occurs. If accepted, at step 1018 the battery bot navigates to the location and the transfer occurs.

Figure 11:
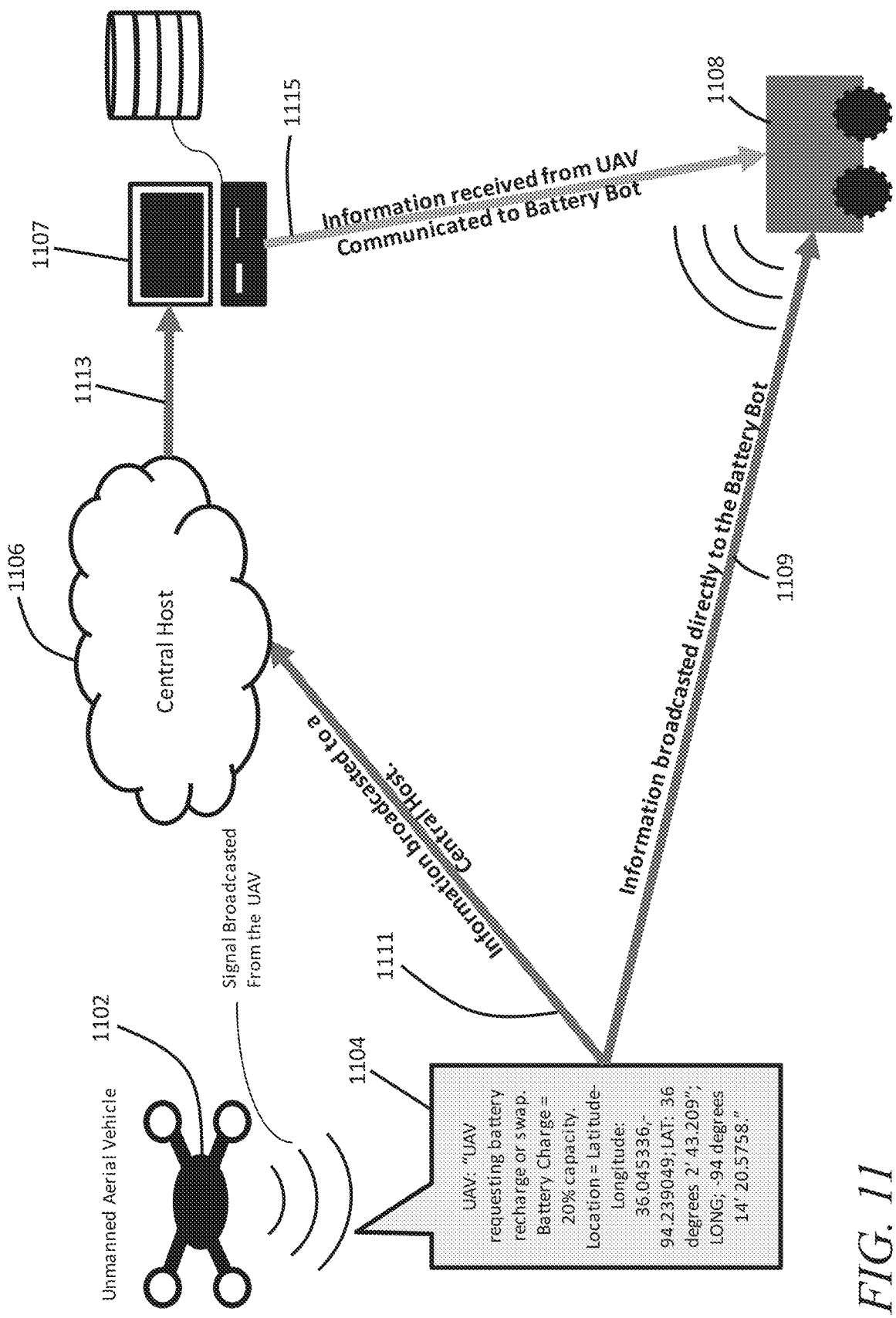
FIG. 11 is a block diagram showing aspects of a re-charging or swapping process in accordance with some embodiments.

Referring now to FIG. 11, one example of coordination between a drone and battery bot is described. In this example, an unmanned aerial vehicle (drone) 1102 transmits the need for a battery re-charge or swap. This information is broadcast in a message 1104 that is received at a central host 1107 (via a network 1106) and a battery bot 1108. The battery bot 1108 either receives the information directly from the drone 1102 (via path 1109) or from the host (via paths 1111, 1113, and 1115).

Figure 12:
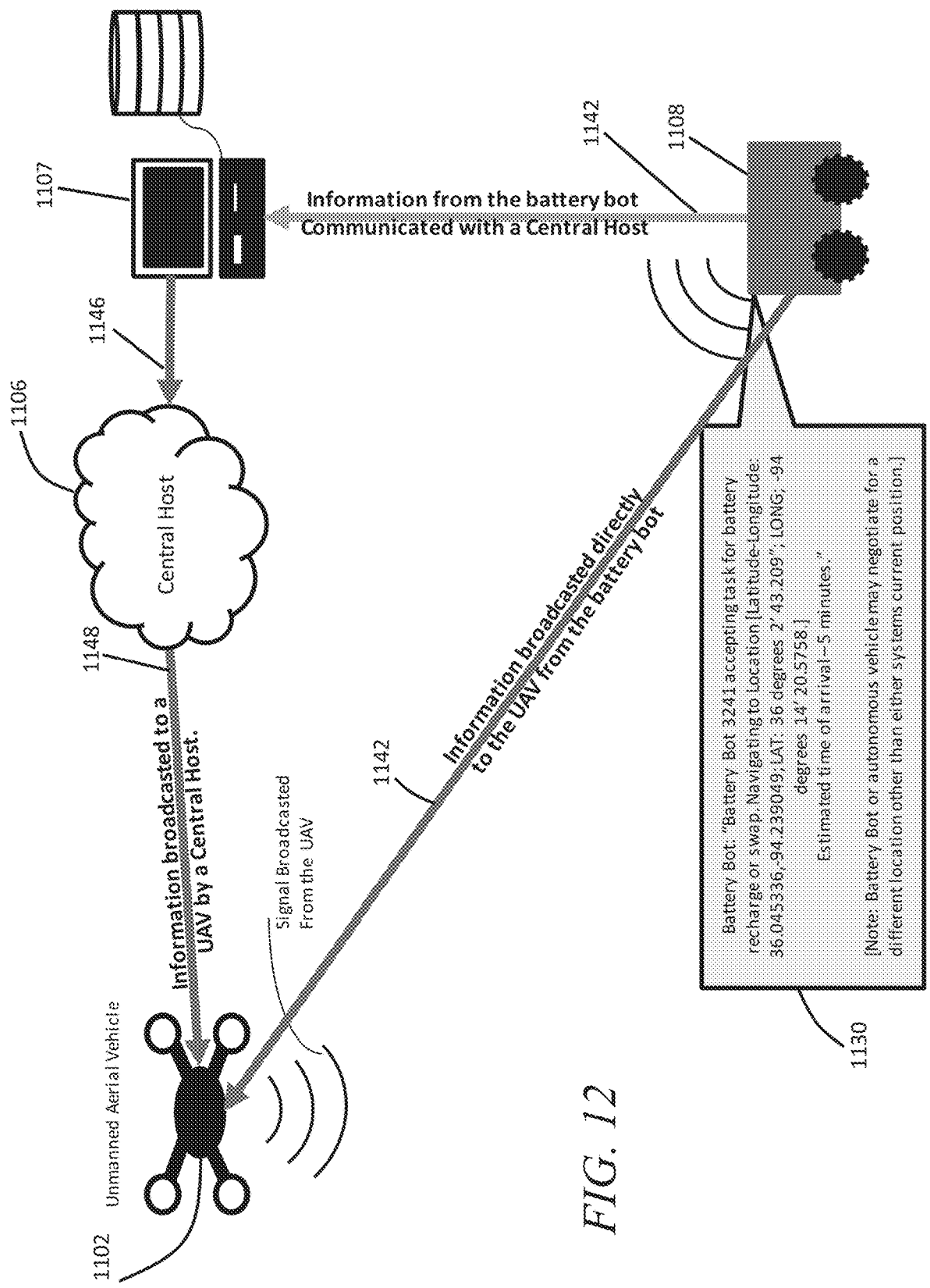
FIG. 12 is showing aspects of a re-charging or swapping process in accordance with some embodiments.

Referring now to FIG. 12, one example of coordination between a drone (or other autonomous vehicle) and battery bot is described. FIG. 12 continues the process that began in FIG. 11. In this example, the battery bot 1108 acknowledges the need for a battery re-charge or swap and the need for coordinating and/or negotiating a location for the swap (or re-charge). The battery bot 1108 may send a message 1130 directly to the drone 1102 (via path 1142), or indirectly using the central host 1107 and network 1106 (via paths 1144, 1146, and 1148).

Figure 13A:
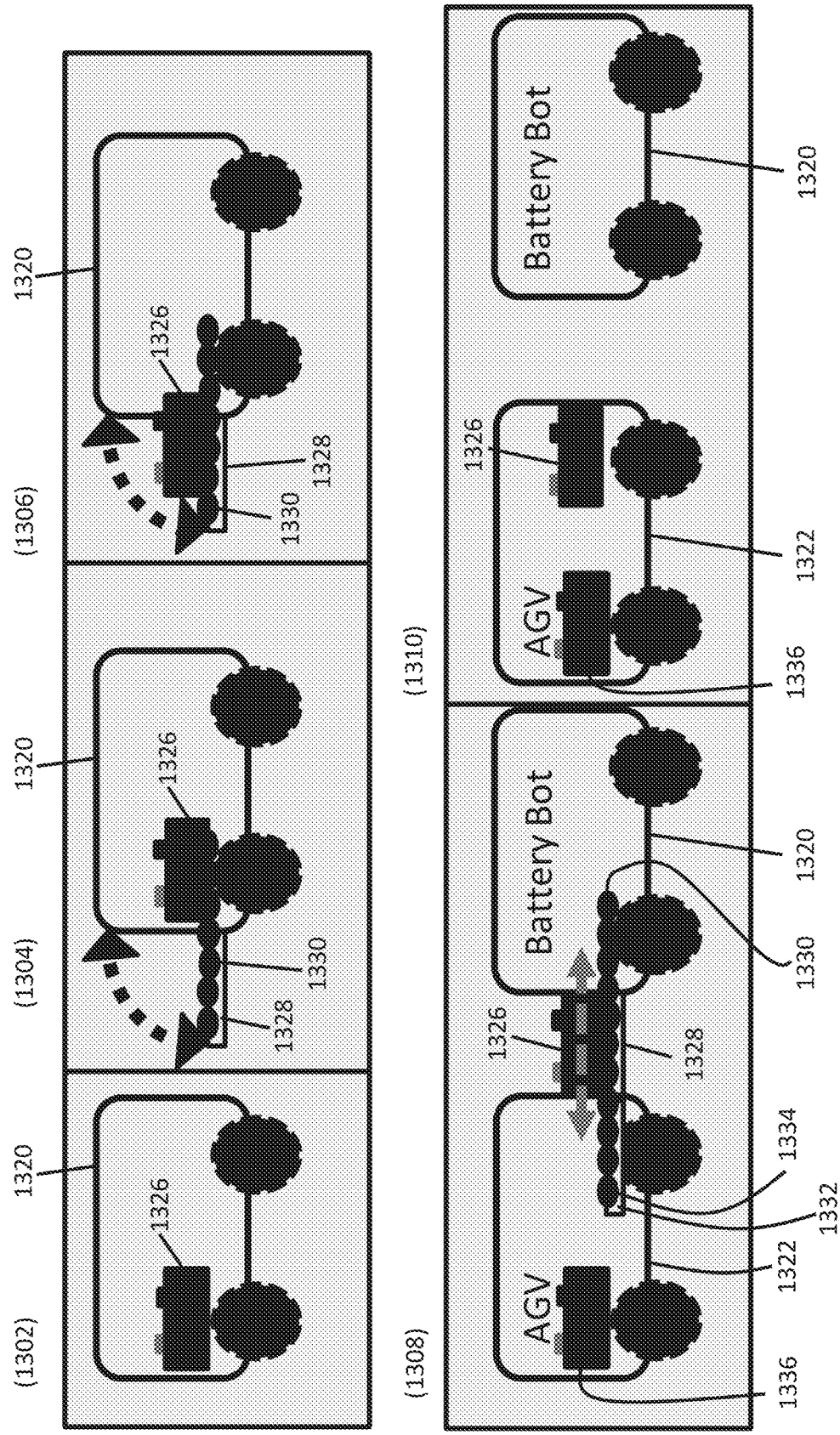
FIGS. 13A and 13B show a series of diagrams showing a swapping process between a battery bot and an automated ground vehicle in accordance with some embodiments.
Figure 13B:
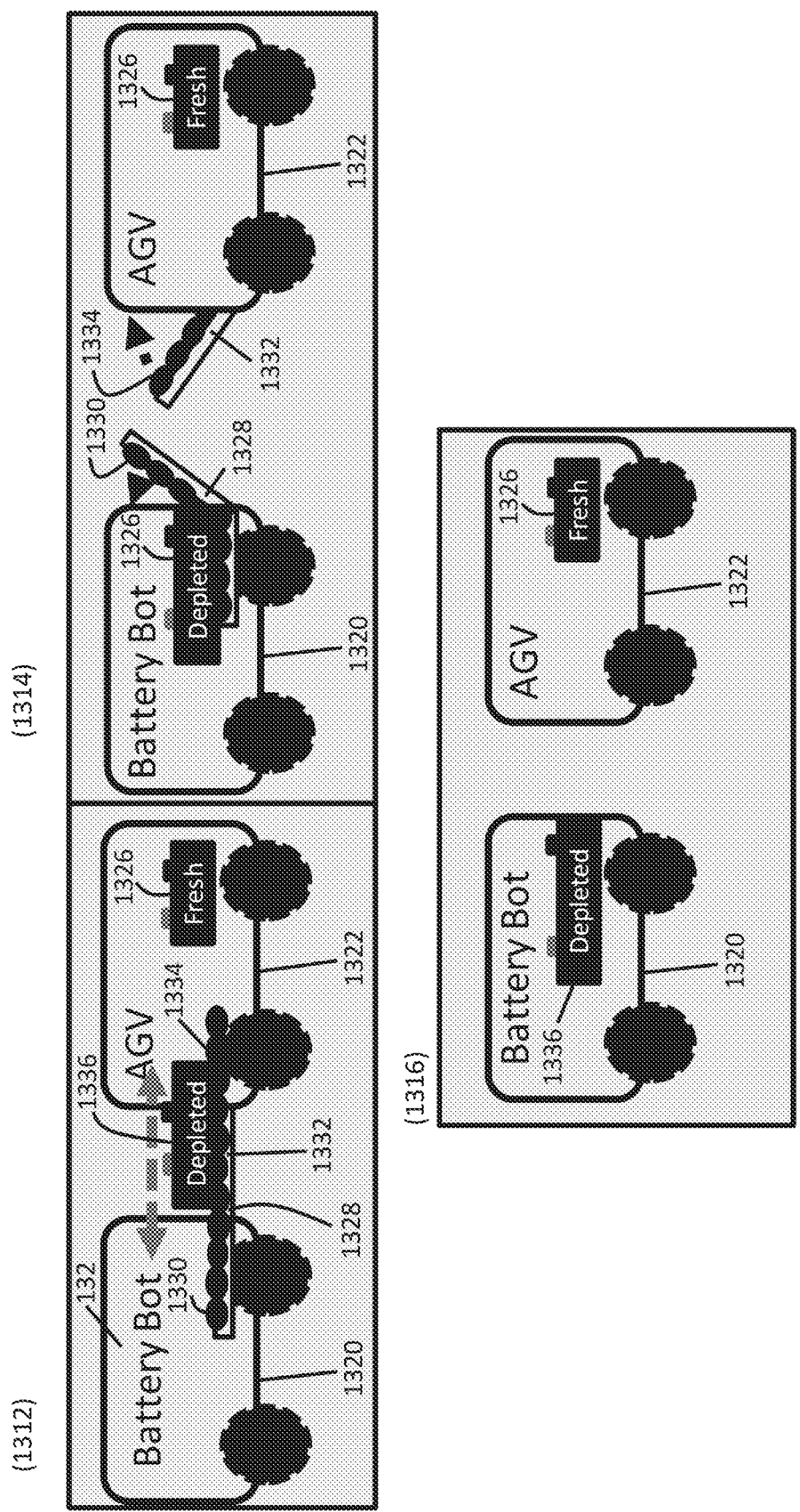

Referring now to FIG. 13A and FIG. 13B, one example of a battery exchange process between a battery bot 1320 and an automated ground vehicle (AGV) 1322 is described. At step 1302, a charged replacement battery 1326 is stored in the battery bot 1320. At step 1304, the payload door 1328 of the battery bot 1320 opens. At step 1306, the battery bot 1320 moves the stored battery 1326 from its storage chamber using a conveyor belt 1330.

At step 1308, the battery bot 1320 transfers the battery 1326 to the AGV 1322 using the conveyor belt 1330. The AGV 1322 opens its payload door 1332, which includes a conveyor belt 1334. The AGV 1322 also has a battery 1336 to be replaced.

At step 1310, the battery bot 1320 has transferred the replacement battery 1326 to the AGV 1322. Doors 1328 and 1332 are closed. At step 1312, the AGV 1322 begins transfer of the depleted battery 1326 to the battery bot 1320 using the conveyor belts 1330 and 1334. It will be appreciated that the conveyor belts 1330 and 1334 are arranged to cooperate and move batteries together when the doors of the battery bot 1320 and AGV 1322 are lowered and aligned. That is, once the doors are lowered the conveyor belts 1330 and 1334 form a single unit that cooperatively moves the batteries within and between the battery bot 1320 and AGV 1322. At step 1314, the exchange between the battery bot 1320 and the AGV 1322 is completed and the doors are retracted. At step 1316, the transfer of the depleted battery 1336 is complete.

Figure 14A:
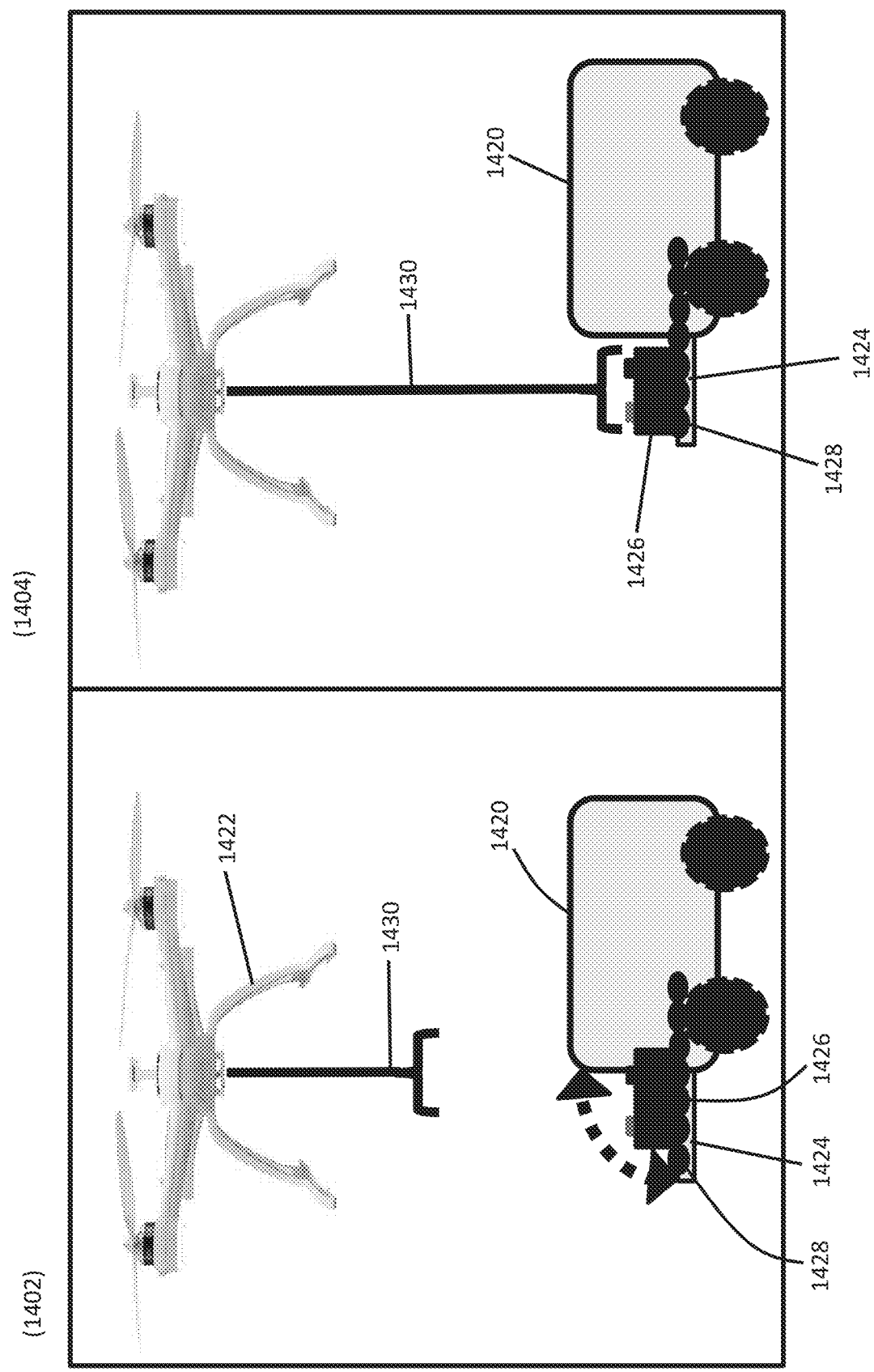
FIGS. 14A and 14B show a series of diagrams showing a swapping process between a battery bot and an aerial drone in accordance with some embodiments.
Figure 14B:
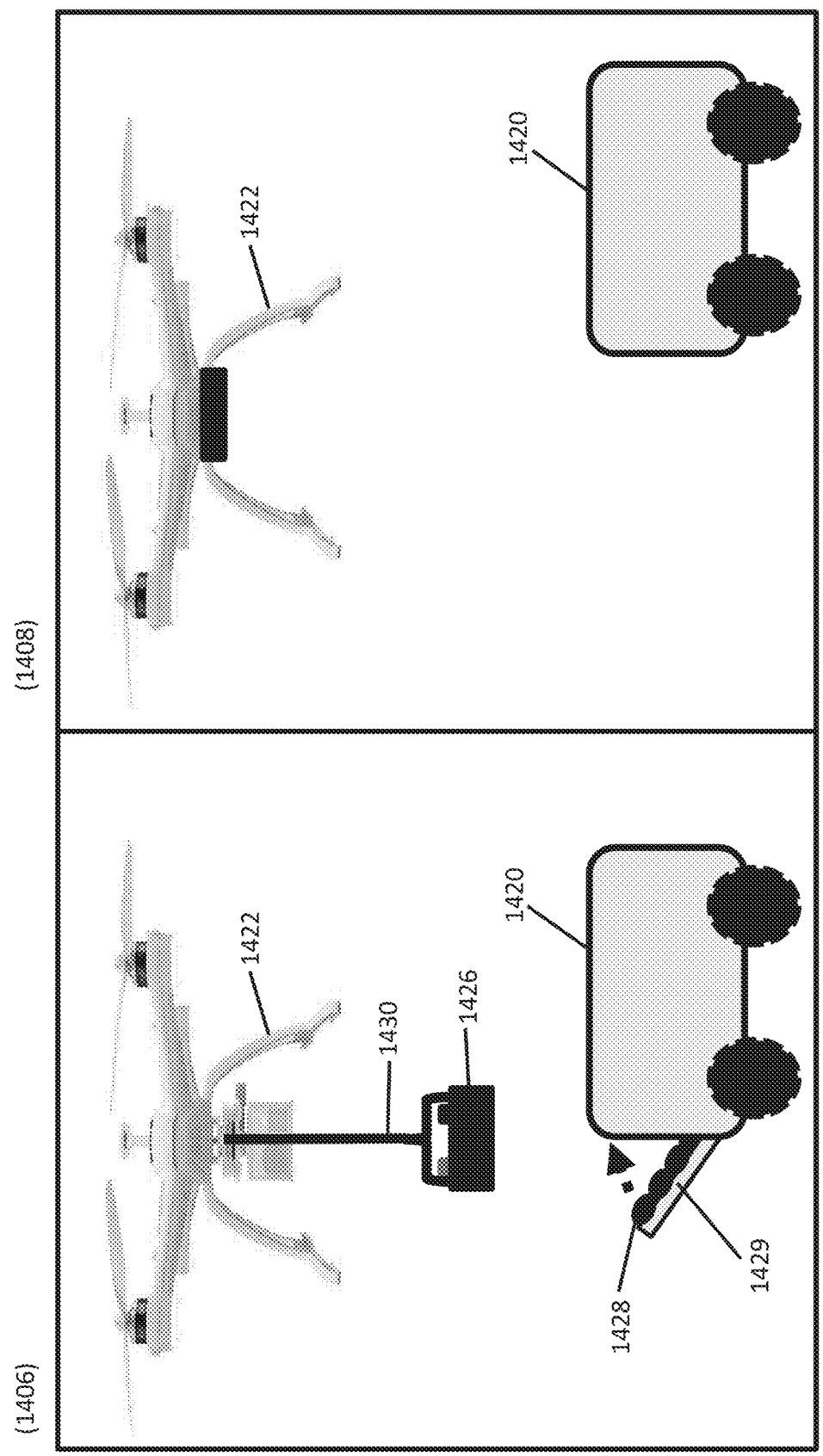

Referring now to FIG. 14A and FIG. 14B, one example of swapping batteries between a battery bot 1420 and an aerial drone (or other autonomous vehicle) 1422 is described. At step 1402, the battery bot 1420 opens its door 1424 and extracts a battery 1426 from a chamber using a conveyor belt 1428. At step 1404, a crane 1430 from the drone 1422 connects to the battery 1426.

At step 1406, the drone 1422 uses the crane 1430 to move the battery 1406 into its storage chamber. The battery bot 1420 closes its door 1424. At step 1408, the drone 1422 has secured the battery in its battery chamber and the process is complete.

Figure 15:
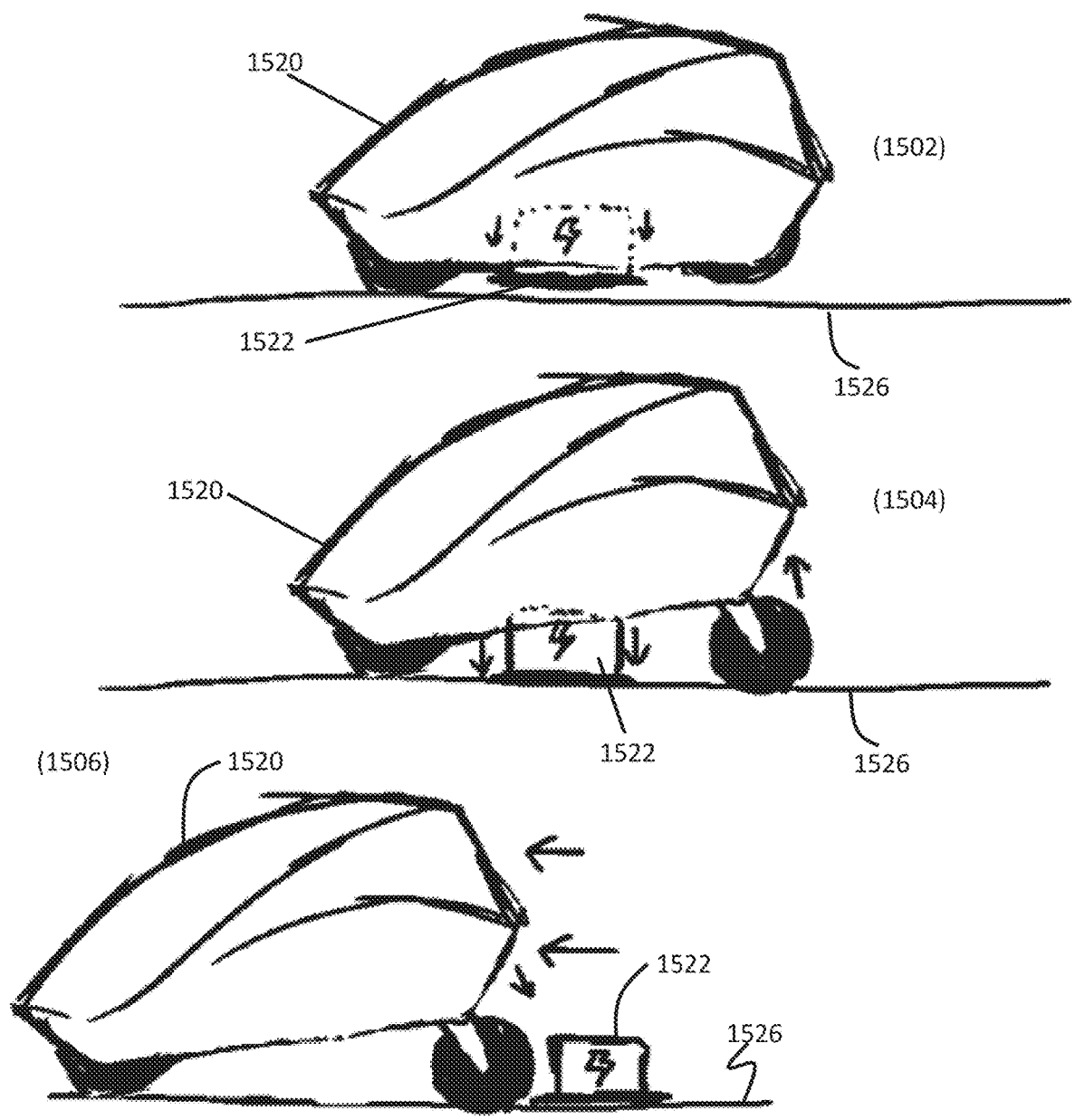
FIG. 15 shows a series of diagrams showing a swapping process using a battery bot in accordance with some embodiments.

Referring now to FIG. 15, one example of a battery bot 1520 transferring a battery 1522 is described. At step 1502, the battery bot 1520 begins to drop the battery to the ground 1526. At step 1504, the battery 1524 reaches the ground 1526. At step 1506, the battery bot 1520 drives away. Subsequently, an autonomous vehicle (e.g., an autonomous ground vehicle or aerial drone) may pick up the battery from the ground.

Figure 16:
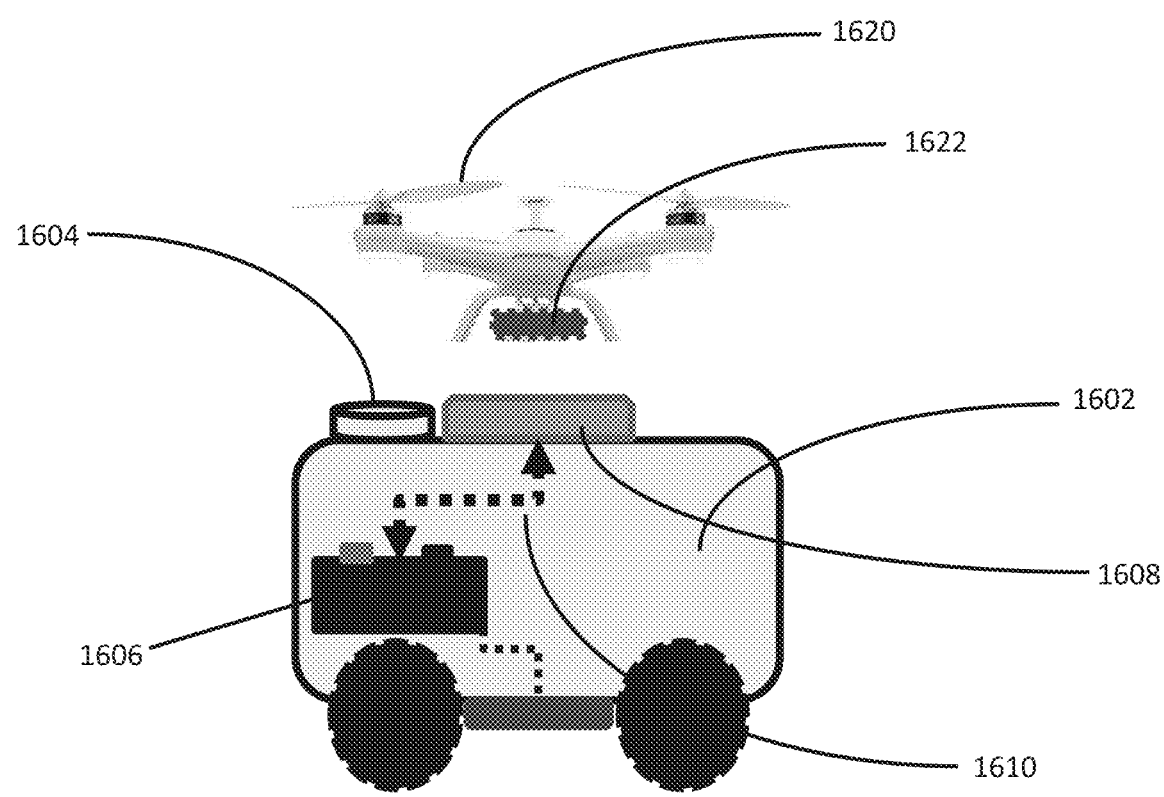
FIG. 16 is a block diagram showing a wireless re-charging process between a battery bot and an aerial drone in accordance with some embodiments.

Referring now to FIG. 16, one example of the wireless charging of a battery at an autonomous vehicle (in this case, an aerial drone) is described. A battery bot 1602 includes a beacon and availability sensor 1604, a battery 1606, and a power source resonator 1608 (coupled to the battery 1606 with an electric current line 1610). A control circuit (not shown in FIG. 16) directs operations of the battery bot 1602.

The beacon and availability sensor 1604 establishes communications between the battery bot 1602 and a drone 1620. Electrical energy from the battery 1606 is transferred to the power source resonator 1608 via electric current line 1610. The power source resonator 1608 converts the electrical current into RF energy and transmits the RF energy at a particular frequency. Resonators are well known in the art and will not be described further here. A power capture resonator 1622 at the drone 1620 receives the RF signal, and converts the RF signal into electrical current, which is used to charge a battery at the drone 1620. In other examples, the resonator 1622 is disposed at a location other than at the drone 1620.

Figure 17:
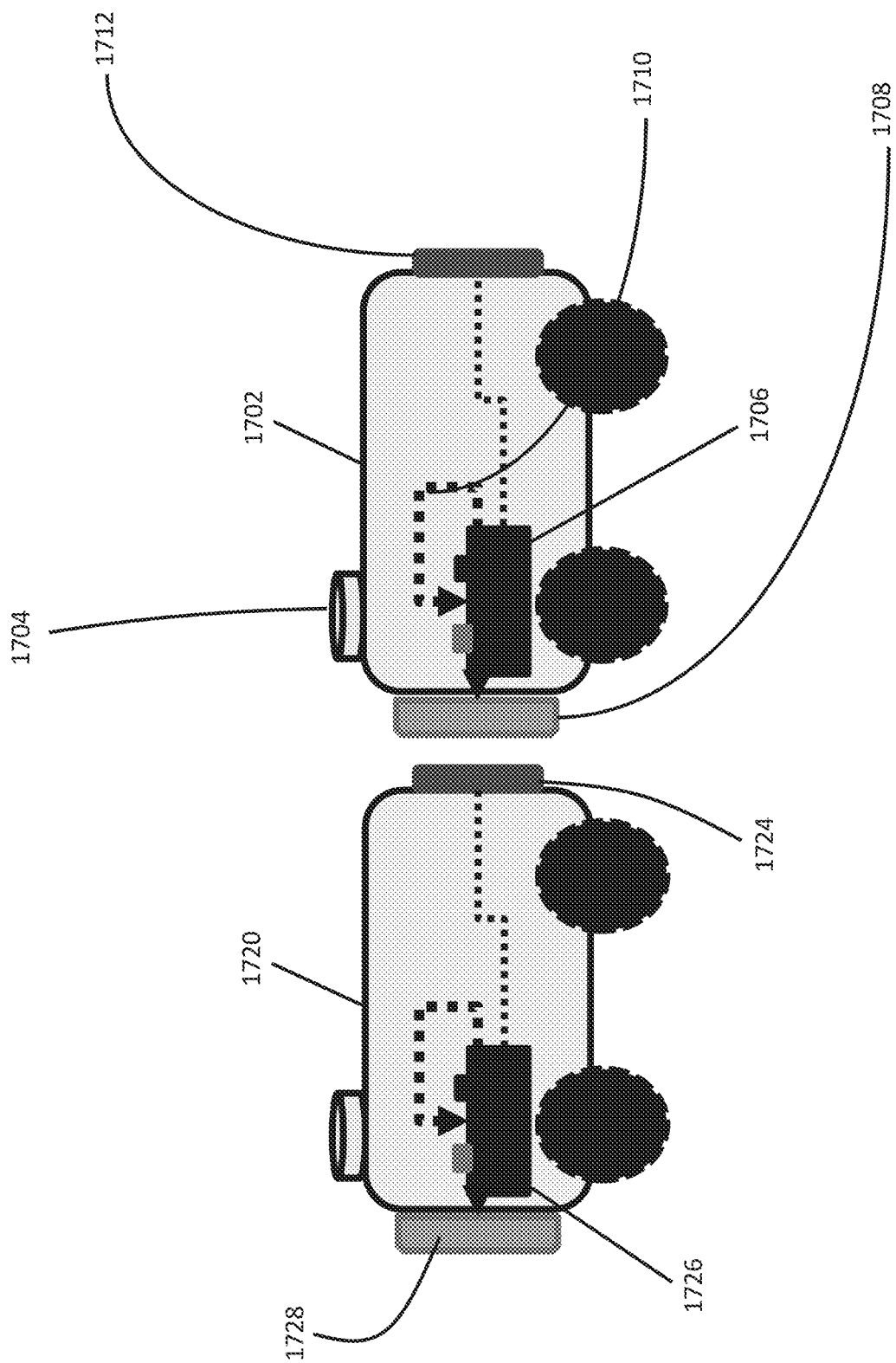
FIG. 17 is a block diagram showing a wireless re-charging process between a battery bot and an autonomous ground vehicle in accordance with some embodiments.

Referring now to FIG. 17, another example of the wireless charging of a battery at an autonomous vehicle (in this case, an autonomous ground vehicle) is described. A battery bot 1702 includes a beacon and an availability sensor 1704, a battery 1706, and a power source resonator 1708 (coupled to the battery 1706 with an electric current line 1710). A control circuit (not shown in FIG. 17) directs operations of the battery bot 1702.

The beacon and availability sensor 1704 establishes communications between the battery bot 1702 and an autonomous ground vehicle 1720. Electrical energy from battery 1706 is transferred to the power source resonator 1708 via electric current line 1710. The power source resonator 1708 converts the electrical current into RF energy and transmits the RF energy at a particular frequency. Resonators are well known in the art and will not be described further here. A power capture resonator 1722 at the autonomous ground vehicle 1720 receives the RF signal, and converts the RF signal into electrical current, which is used to charge a battery 1724 at the drone 1720. In other examples, another resonator 1712 is disposed at the battery bot 1702 and allows the battery bot 1702 to re-charge its battery 1706 wirelessly from still another source (e.g., another battery bot, or a device at a fixed location such as a re-charge device built into the floor or ground at the base station of the battery bot 1702). Additionally, the automated ground vehicle 1720 may have another resonator 1728 allowing the ground vehicle 1720 to function as a battery bot.

Figure 18:
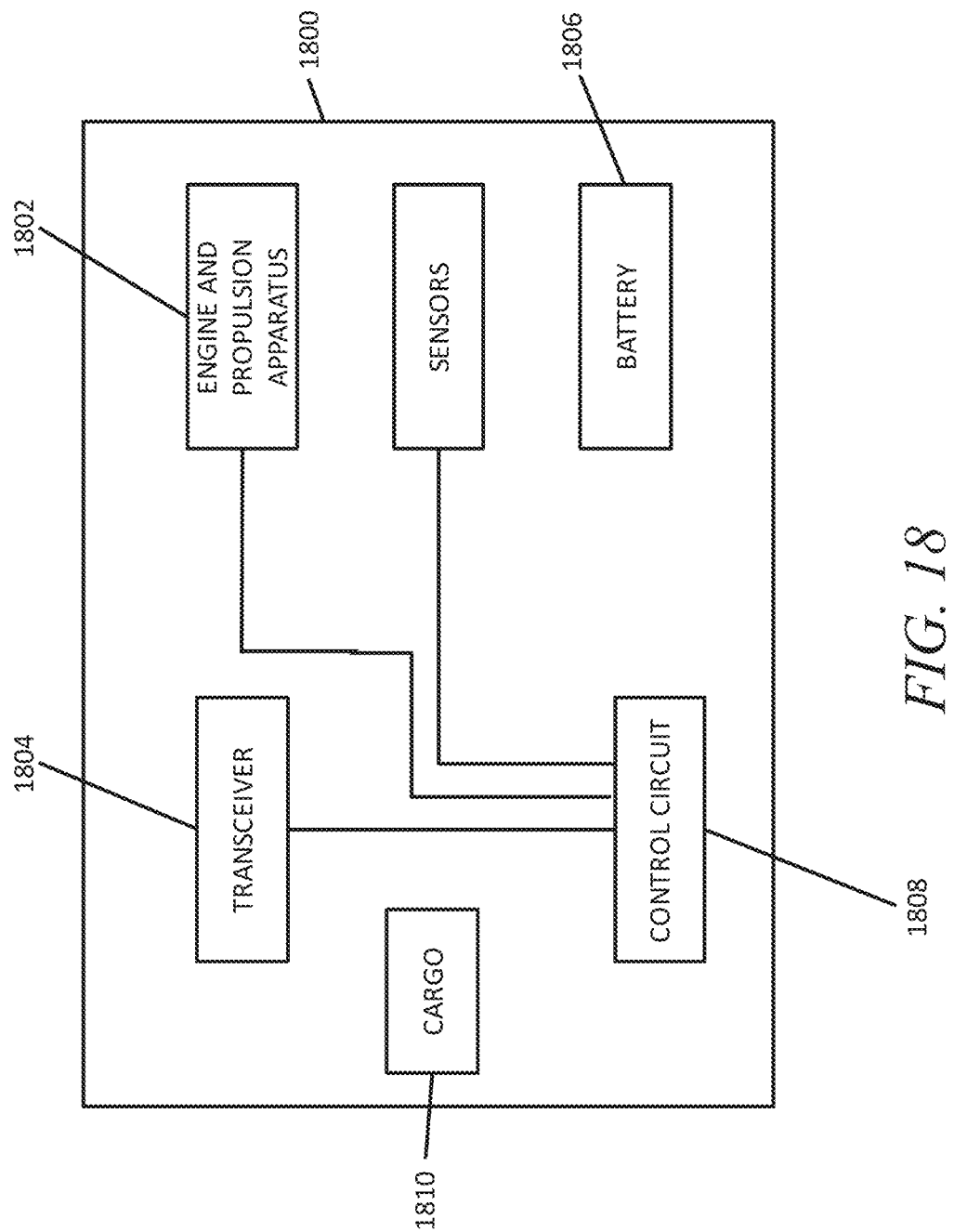
FIG. 18 is a block diagram showing an unmanned autonomous vehicle in accordance with some embodiments.

Referring now to FIG. 18, an unmanned autonomous vehicle 1800 that operates in the field away from a base and potentially in need of battery optimization is described. In aspects, the unmanned autonomous vehicle 1800 is an aerial drone or a ground vehicle. The unmanned autonomous vehicle 1800 includes an engine and a propulsion apparatus 1802, a transceiver 1804, a battery 1806, and a control circuit 1808. The unmanned autonomous vehicle 1800 also includes a cargo 1810. For example, the cargo 1810 may be a package or packages to be delivered by the vehicle 1800 along a package delivery route.

The engine and a propulsion apparatus 1802 includes an engine that generates power and a propulsion apparatus (e.g., blades, wheels) that are driven by the engine. The engine may be powered by the battery 1806 or by carbon-based fuel (e.g., gasoline).

The transceiver 1806 transmits communications from and receives communications directed to the unmanned autonomous vehicle 1800. The battery 1806 is any type of energy storage device that powers all or some of the elements of the unmanned autonomous vehicle 1800. Sensors 1807 may detect current, voltage, and/or power levels of the battery 1807 and these levels may be evaluated by the control circuit 1808.

The control circuit 1808 is coupled to the engine and propulsion apparatus 1802, the transceiver 1804, the battery 1806 (and/or sensors 1807). The control circuit 1808 is configured to operate the engine and propulsion apparatus 1802 in order to move the vehicle 1800 in the field. For example, the control circuit 1808 may instruct the engine to operate and control the speed of the propulsion system (e.g., how fast wheels or a propeller turns).

The control circuit 1808 is configured to sense at least one operational characteristic (e.g., voltage, current, or power) of the battery using the sensors 1808, and conduct an evaluation, based upon the operational characteristic of the battery, of when to have the battery 1806 replaced or recharged by a battery optimization vehicle. For example, the sensors 1808 may sense a voltage level of the battery 1806 and this may be compared to a predetermined level. When the sensed voltage level falls below the predetermined level, this may indicate that the battery 1806 needs to be replaced or recharged.

The control circuit 1808 is configured to transmit a message via the transceiver 1804 to request that a battery optimization vehicle replace or re-charge the battery 1806 based upon the evaluation. The message may include authentication information (used for authentication purposes by the battery optimization vehicle), whether a re-charge or replacement is requested, and the location of the vehicle 1800.

Subsequently, the control circuit 1808 communicates with the battery optimization vehicle (via the transceiver 1804) to allow the battery optimization vehicle to recharge or replace the battery. This communication sequence may include authentication procedures or sequences, and guidance to the battery optimization vehicle so that the battery optimization vehicle is optimally positioned to re-charge or replace the battery 1806 at the vehicle 1800.

Figure 19:
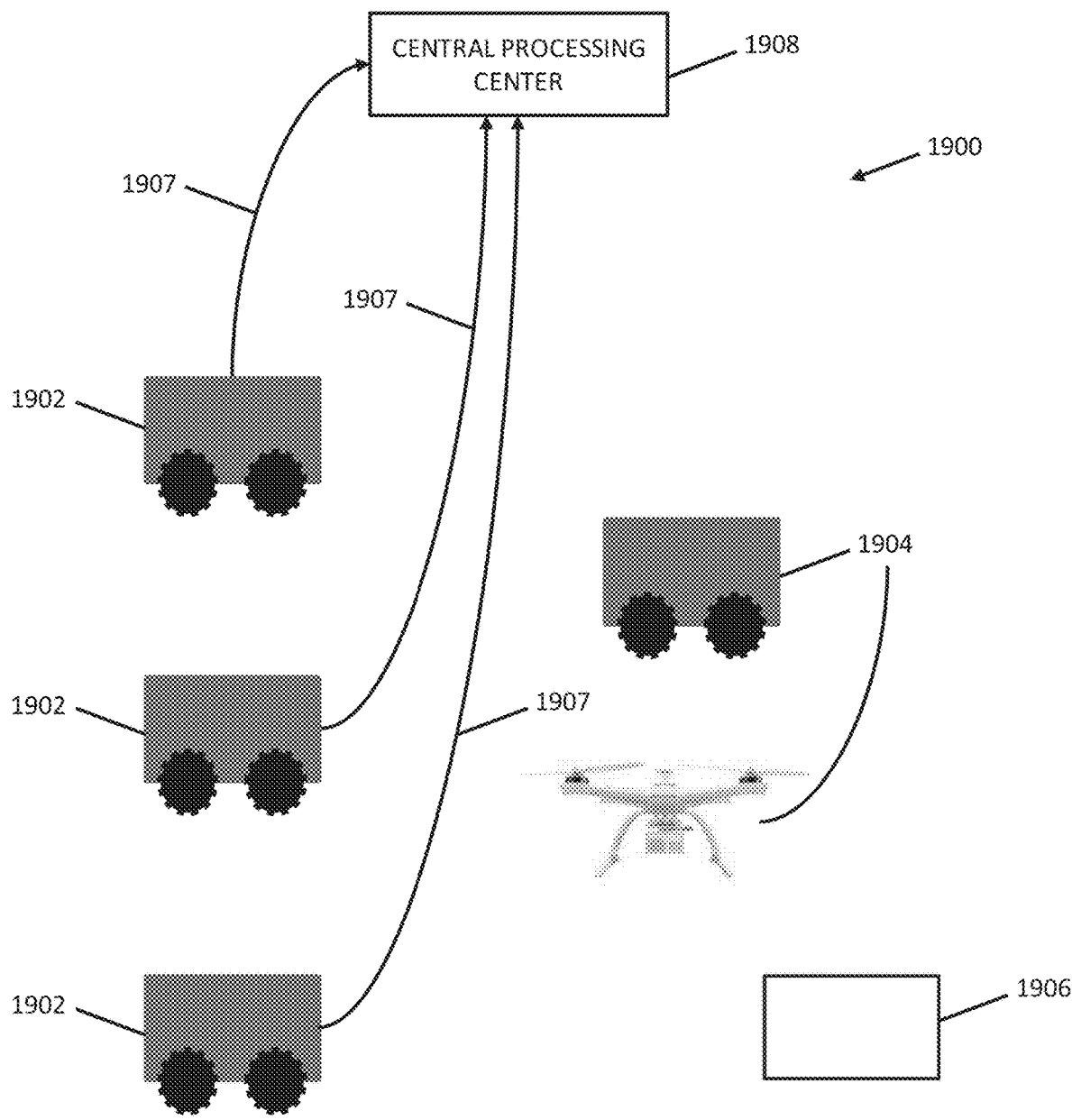
FIG. 19 is a block diagram showing a system that optimizes batteries of unmanned autonomous vehicles in accordance with some embodiments.

Referring now to FIG. 19, a system 1900 of battery optimization vehicles that optimizes batteries or other power storage devices in autonomous vehicles is described. The system 1900 includes multiple unmanned battery optimization vehicles 1902 that operate independently (e.g., without being under the control of a home office or centralized control center). The battery optimization vehicles 1902 optimize batteries in autonomous vehicles 1904.

In one example of the operation of the system of FIG. 19, the unmanned autonomous vehicles 1904 operate in the field (e.g., any geographic area) independently and away from a base 1906. The unmanned autonomous vehicles 1904 include a battery, and the battery has a condition requiring optimization.

As mentioned, the unmanned battery optimization vehicles 1902 also operate in the field and independently discover the condition of the battery of the unmanned autonomous vehicles 1904. The vehicles 1902 independently navigate to unmanned autonomous vehicles 1904 in need of battery service. When the unmanned battery optimization vehicle 1902 reaches the location of the unmanned autonomous vehicle 1904 in need of battery service, the unmanned battery authorization vehicle 1902 engages in an interaction with the battery. The interaction is effective to optimize operation of the battery at the unmanned autonomous vehicle 1904. For example, the interaction is to repair or replace the battery.

In aspects, each unmanned autonomous vehicle 1904 further includes a propulsion system, a transceiver, and a control circuit that is coupled to the propulsion system, the transceiver, and the battery. The control circuit is configured to operate the propulsion system to move the vehicle in the field and sense at least one operational characteristic (e.g., power, voltage, or current level) of the battery. The control circuit is further configured to conduct an evaluation (based upon the operational characteristic of the battery) of when to have the battery replaced or recharged by one of the battery optimization vehicles 1902. The control circuit is further configured to transmit a message via the transceiver to request that a battery optimization vehicle 1902 replace or re-charge the battery based upon the evaluation, and to subsequently communicate with the battery optimization vehicle 1902 to allow the battery optimization vehicle to recharge or replace the battery.

In other aspects, each of the battery optimization vehicles 1902 include a transceiver that is configured to transmit and receive signals, a battery optimization apparatus that is configured to interact with a battery disposed at an unmanned autonomous vehicle that is also operating in the product delivery network, and a control circuit.

The control circuit is coupled to the transceiver and the battery optimization apparatus, and is configured to cause the unmanned battery optimization vehicle 1902 to independently navigate and travel to a present location of the autonomous vehicle 1904 in need of battery service based at least in part upon the signals received at the transceiver. The control circuit is configured to, when the unmanned battery optimization vehicle 1902 reaches the present location of the unmanned autonomous vehicle 1904, direct the battery optimization apparatus to engage in an interaction with the battery at the unmanned autonomous vehicle 1904. The interaction is effective to optimize battery operation at the unmanned autonomous vehicle 1904.

In other examples, an audit trail of repairs made to autonomous vehicles 1904 is maintained. For example, each battery optimization vehicle 1902 may maintain information including identities of the vehicles it repairs, the location of the repairs, the nature of the repairs, the time of day of the repairs, the time length needed to make the repairs, and the results (e.g., success or failure) of the repairs. Blockchain or other similar approaches may be used to log repair events. The vehicles 1902 may transmit its log 1907 to a central processing center 1908. Other optimization vehicles may also send their logs to the central processing center 1908, which may assemble, present, or further process the information. Users are system control personnel that can then view the information and may take actions as needed (e.g., change battery types in vehicles when it is determined that certain types of batteries are constantly failing and are potentially defective).

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned battery optimization vehicle that operates in a product delivery network, comprising:
   a transceiver that is configured to transmit and receive signals;
   a battery optimization apparatus that is configured to interact with a battery disposed at an unmanned autonomous vehicle that is also operating in the product delivery network;
   a control circuit coupled to the transceiver and the battery optimization apparatus; and
   wherein the control circuit determines whether to service the unmanned autonomous vehicle, and when the control circuit determines to service the unmanned autonomous vehicle, the control circuit then determines whether to accept a present location of the unmanned autonomous vehicle;
   wherein when the present location of the unmanned autonomous vehicle is accepted by the control circuit, the control circuit causes the unmanned battery optimization vehicle to be navigated to the present location of the unmanned autonomous vehicle;
   wherein when the present location of the unmanned autonomous vehicle is not accepted by the control circuit, the control circuit negotiates with the unmanned autonomous vehicle to determine a new location for servicing the unmanned autonomous vehicle;
   when the unmanned battery optimization vehicle reaches the present location or the new location of the unmanned autonomous vehicle, the control circuit is further configured to direct the battery optimization apparatus to engage in an interaction with the battery at the unmanned autonomous vehicle, the interaction being effective to optimize battery operation at the unmanned autonomous vehicle.

2. The vehicle of claim 1, wherein the interaction exchanges the battery at the unmanned autonomous vehicle with a replacement battery.

3. The vehicle of claim 1, wherein the interaction utilizes a physical connection between the unmanned battery optimization vehicle and the unmanned autonomous vehicle to charge the battery of the unmanned autonomous vehicle.

4. The vehicle of claim 1, wherein the interaction comprises a wireless charging of the battery from the unmanned battery optimization vehicle and the unmanned autonomous vehicle.

5. The vehicle of claim 1, wherein the unmanned battery optimization vehicle includes a first storage receptor and a replacement battery disposed in the first storage receptor, and a second storage receptor that is configured to receive the battery from the unmanned autonomous vehicle.

6. The vehicle of claim 1, wherein the control circuit is configured to receive battery charge level information transmitted from the unmanned autonomous vehicle via the transceiver.

7. The vehicle of claim 6, wherein the control circuit utilizes the battery charge level information to prioritize battery optimization at a plurality of unmanned autonomous vehicles.

8. The vehicle of claim 1, wherein the unmanned autonomous vehicle is a vehicle selected from the group consisting of an aerial drone and a ground vehicle.

9. The vehicle of claim 1, wherein signals are broadcast from the transceiver that seek to identify candidate unmanned autonomous vehicles needing battery replacement.

10. The vehicle of claim 1, wherein broadcast signals are received at the transceiver identifying unmanned autonomous vehicles that desire battery replacement.

11. An unmanned autonomous vehicle, the unmanned autonomous vehicle operating in the field away from a base, the vehicle comprising:
an engine and a propulsion apparatus;
a transceiver;
a battery;
a sensor;
a control circuit that is coupled to the sensor, the engine and propulsion apparatus, and the transceiver, the control circuit configured to:
operate the engine and propulsion apparatus to move the vehicle in the field;
sense at least one operational characteristic of the battery using the sensor;
conduct an evaluation, based upon the operational characteristic of the battery, of when to have the battery replaced or recharged by a battery optimization vehicle;
transmit a message via the transceiver to request that a battery optimization vehicle replace or re-charge the battery based upon the evaluation;
subsequently communicate with the battery optimization vehicle via the transceiver to allow the battery optimization vehicle to recharge or replace the battery;
wherein the battery optimization vehicle determines whether to service the unmanned autonomous vehicle, and when the battery optimization vehicle determines to service the unmanned autonomous vehicle, the battery optimization vehicle then determines whether to accept a present location of the unmanned autonomous vehicle;
wherein when the present location of the unmanned autonomous vehicle is accepted by the battery optimization vehicle, the unmanned battery optimization vehicle is navigated to the present location of the unmanned autonomous vehicle;
wherein when the present location of the unmanned autonomous vehicle is not accepted by the battery optimization vehicle, the unmanned battery optimization vehicle negotiates with the unmanned autonomous vehicle to determine a new location for servicing the unmanned autonomous vehicle.

12. The unmanned autonomous vehicle of claim 11, wherein the unmanned autonomous vehicle is an aerial drone or a ground vehicle.

13. The unmanned autonomous vehicle of claim 11, wherein the operational characteristic is a voltage, and electrical current, or a power.

14. The unmanned autonomous vehicle of claim 11, wherein the unmanned autonomous vehicle carries a package and is on a package delivery route.

15. A system for recharging or replacing a battery at a disabled vehicle, the system comprising:
an unmanned autonomous vehicle, the unmanned autonomous vehicle operating in the field independently and away from a base, the unmanned autonomous vehicle including a battery, the battery having a condition requiring optimization;
an unmanned battery optimization vehicle, the unmanned optimization vehicle operating in the field to independently to discover the condition of the battery of the unmanned autonomous vehicle, and to independently navigate to the unmanned autonomous vehicle;
wherein the unmanned battery optimization vehicle determines whether to service the unmanned autonomous vehicle, and when the unmanned battery optimization vehicle determines to service the unmanned autonomous vehicle, the unmanned battery optimization vehicle then determines whether to accept a present location of the unmanned autonomous vehicle;
wherein when the present location of the unmanned autonomous vehicle is accepted by the battery optimization vehicle, the unmanned battery optimization vehicle is navigated to the present location of the unmanned autonomous vehicle;
wherein when the present location of the unmanned autonomous vehicle is not accepted by the battery optimization vehicle, the unmanned battery optimization vehicle negotiates with the unmanned autonomous vehicle to determine a new location for servicing the unmanned autonomous vehicle;
wherein when the unmanned battery optimization vehicle reaches the present location or the new location of the unmanned autonomous vehicle, the unmanned battery authorization vehicle engages in an interaction with the battery, the interaction being effective to optimize operation of the battery at the unmanned autonomous vehicle.

16. The system of claim 15, wherein the unmanned autonomous vehicle further comprising:
a propulsion system;
a transceiver;
a control circuit that is coupled to the propulsion system, the transceiver, and the battery, the control circuit configured to:
operate the propulsion system to move the vehicle in the field;
sense at least one operational characteristic of the battery;
conduct an evaluation, based upon the operational characteristic of the battery, of when to have the battery replaced or recharged by the battery optimization vehicle;
transmit a message via the transceiver to request that a battery optimization vehicle replace or re-charge the battery based upon the evaluation;

subsequently communicate with the battery optimization vehicle to allow the battery optimization vehicle to recharge or replace the battery.

17. The system of claim 15, wherein the battery optimization vehicle further comprises:
- a transceiver that is configured to transmit and receive signals;
- a battery optimization apparatus that is configured to interact with a battery disposed at an unmanned autonomous vehicle that is also operating in the product delivery network;
- a control circuit coupled to the transceiver and the battery optimization apparatus, the control circuit being configured to cause the unmanned battery optimization vehicle to independently navigate and travel to a present location of the autonomous vehicle based at least in part upon the signals received at the transceiver; and when the unmanned battery optimization vehicle reaches the present location of the unmanned autonomous vehicle, the control circuit is further configured to direct the battery optimization apparatus to engage in an interaction with the battery at the unmanned autonomous vehicle, the interaction being effective to optimize battery operation at the unmanned autonomous vehicle.

18. The system of claim 15, wherein the interaction is re-charging or replacing the battery.

19. The system of claim 15, wherein the unmanned autonomous vehicle comprises an aerial drone or an unmanned automated ground vehicle.

20. The system of claim 15, wherein the unmanned autonomous vehicle carries a package and is on a package delivery route.

* * * * *